US012794690B2

(12) United States Patent
Kar et al.

(10) Patent No.: US 12,794,690 B2
(45) Date of Patent: Nov. 10, 2026

(54) TECHNIQUES FOR A KEY MANAGEMENT SERVICE IN AN OVERLAY NETWORK

(71) Applicant: Oracle International Corporation, Redwood Shores, CA (US)

(72) Inventors: Sidhanta Kumar Kar, Seattle, WA (US); Danyu Yang, Woodinville, WA (US); Rakesh Ganimini Baskar, Bellevue, WA (US); Dylan Graham Overstreet, Lynchburg, VA (US); Taj Ai Isono, Everett, WA (US)

(73) Assignee: Oracle International Corporation, Redwood Shores, CA (US)

( * ) Notice: Subject to any disclaimer, the term of this patent is extended or adjusted under 35 U.S.C. 154(b) by 28 days.

(21) Appl. No.: 19/075,720

(22) Filed: Mar. 10, 2025

(65) Prior Publication Data

US 2025/0293876 A1 Sep. 18, 2025

Related U.S. Application Data

(60) Provisional application No. 63/564,195, filed on Mar. 12, 2024, provisional application No. 63/568,234, (Continued)

(51) Int. Cl.
*H04L 9/08* (2006.01)

(52) U.S. Cl.
CPC .......... *H04L 9/0894* (2013.01); *H04L 9/0822* (2013.01)

(58) Field of Classification Search
CPC ... H04L 9/0894; H04L 9/0822; H04L 9/0825; H04L 9/0897; H04L 9/3265
See application file for complete search history.

(56) References Cited

U.S. PATENT DOCUMENTS 8,572,389 B2 * 10/2013 Little .................... H04L 9/0822 713/168
8,671,279 B2 * 3/2014 Brouwer ................. G06F 11/10 713/180

(Continued)

FOREIGN PATENT DOCUMENTS

CN 114651421 A 6/2022
WO 2007103483 A1 9/2007

(Continued)

OTHER PUBLICATIONS

"[MS-BKRP]: Protocol Examples." [MS-BKRP]: Protocol Examples | Microsoft Learn, Dec. 12, 2023, learn.microsoft.com/en-us/openspecs/windows_protocols/ms-bkrp/3f418e3e-e4d5-4cfe-8c97-fe99e011c2bf. Accessed Jun. 22, 2026. (Year: 2023).*

(Continued)

*Primary Examiner* — Michael R Vaughan
(74) *Attorney, Agent, or Firm* — Kilpatrick Townsend & Stockton LLP

(57) ABSTRACT

Techniques are disclosed for implementing a key management service in a reduced footprint data center. A cryptographic service can execute at a computing device of the reduced footprint data center. The cryptographic service can generate a master encryption key and encrypt the master encryption key using a secure component of the computing device to produce an encrypted master encryption key. The encrypted master encryption key can be stored in a block storage volume communicatively connected to the computing device. The cryptographic service can transmit the master encryption key to a host region data center and receive a wrapped master encryption key. The cryptographic service can store the wrapped master encryption key in a database of the reduced footprint data center.

20 Claims, 17 Drawing Sheets

Related U.S. Application Data filed on Mar. 21, 2024, provisional application No. 63/633,966, filed on Apr. 15, 2024, provisional application No. 63/637,691, filed on Apr. 23, 2024, provisional application No. 63/660,377, filed on Jun. 14, 2024, provisional application No. 63/689,572, filed on Aug. 30, 2024, provisional application No. 63/568,061, filed on Mar. 21, 2024.

(56) References Cited

U.S. PATENT DOCUMENTS

| | | | |
|---|---|---|---|
| 10,687,130 B2 | 6/2020 | Yuang et al. | |
| 11,265,709 B2 * | 3/2022 | Murray | G06F 21/602 |
| 11,418,352 B2 | 8/2022 | Williams et al. | |
| 11,671,264 B1 | 6/2023 | Cignetti et al. | |
| 2011/0293097 A1 | 12/2011 | Maino et al. | |
| 2014/0310509 A1 * | 10/2014 | Potlapally | G06F 11/1417 713/2 |
| 2015/0358294 A1 | 12/2015 | Kancharla et al. | |
| 2016/0364252 A1 | 12/2016 | Graf et al. | |
| 2020/0409600 A1 | 12/2020 | Liguori et al. | |
| 2021/0058388 A1 | 2/2021 | Knotwell et al. | |
| 2022/0075695 A1 * | 3/2022 | Khan | G06F 11/1451 |
| 2022/0255859 A1 | 8/2022 | Blair et al. | |
| 2022/0263655 A1 | 8/2022 | Murray | |
| 2023/0109231 A1 | 4/2023 | Adogla et al. | |
| 2023/0133380 A1 | 5/2023 | Kreger-Stickles et al. | |
| 2023/0179429 A1 | 6/2023 | Rosenthol et al. | |
| 2023/0188341 A1 | 6/2023 | Ying et al. | |
| 2023/0246819 A1 | 8/2023 | Schumann, III et al. | |
| 2023/0367607 A1 | 11/2023 | Ulaganathan et al. | |
| 2024/0080242 A1 | 3/2024 | Lee et al. | |

FOREIGN PATENT DOCUMENTS

| | | |
|---|---|---|
| WO | 2023075868 A1 | 5/2023 |
| WO | 2024016084 A1 | 1/2024 |

OTHER PUBLICATIONS

Client Security Solution 8.3 Deployment Guide, ThinkVantage, Dec. 2011, download.lenovo.com/pccbbs/thinkvantage_en/css83dg_en.pdf. Accessed Jun. 22, 2026. (Year: 2011).*

Cisco Catalyst SD-WAN Solution, Available online at: https://www.cisco.com/c/en/us/td/docs/routers/sdwan/configuration/sdwan-xe-gs-book/system-overview.html, Aug. 28, 2024, 27 pages.

Patentability Search Report mailed on Sep. 6, 2024, 29 pages.

Scale Your Cloud Operating Model with HashiCorp and Palo Alto Networks, Available online at: https://www.hashicorp.com/resources/the-cloud-operating-model-with-palo-alto-networks-and-hashicorp, Jan. 1, 2024, 46 pages.

Secure Control Plane and Data Plane Communications, Available online at: https://docs.konghq.com/konnect/gateway-manager/data-plane-nodes/secure-communications/#:~: text=Public%20Key%20Infrastructure%20(PKI)%20mode,control%20plane%20and%20data%20 plane, 1 page.

Secure Storage—OP-TEE Documentation, Available Online at: https://web.archive.org/web/20240419055449/https://optee.readthedocs.io/en/latest/architecture/secure_storage.html , Apr. 19, 2024, 11 pages.

Security Configuration Guide for vEdge Routers, Cisco SD-WAN Releases 19.1, 19.2, and 19.3, Available online at: https://www.cisco.com/c/en/us/td/docs/routers/sdwan/configuration/security/vedge/security-book/security-overview.html, Nov. 22, 2019, 14 pages.

Service Mesh, Istio, and EJBCA, Available Online at: https://www.ejbca.org/resources/tech-update-service-mesh-istio-and-ejbca/, Apr. 4, 2023, 5 pages.

Vault Policy, Available online at: https://docs.konghq.com/mesh/latest/features/vault/, 3 pages.

U.S. Appl. No. 17/648,376, Context Tag Integration With Named Entity Recognition Models filed on Jan. 9, 2024.

U.S. Appl. No. 18/624,472, Digital Assistant Using Generative Artificial Intelligence filed on Apr. 2, 2024.

Acquaviva, Kong Konnect Data Plane 3.5 Deployment and Plugin Configuration with AWS Secrets Manager, IRSA and EKS 1.28, Available online at: https://medium.com/@claudioacquaviva/kong-konnect-data-plane-3-5-c423d7947847, Dec. 11, 2023, 24 pages.

Ilyas, Step-by-Step Guide: Setting Up OpenXPKI for Secure Digital Certificates in Linux, Available online at: https://medium.com/@riskiilyas03/step-by-step-guide-setting-up-openxpki-for-secure-digital-certificates-in-linux-107b06b2c0c1, Dec. 9, 2023, 21 pages.

International Application No. PCT/US2025/018550, International Search Report and Written Opinion mailed on Jul. 1, 2025, 9 pages.

International Application No. PCT/US2025/019365, International Search Report and Written Opinion mailed on Jul. 1, 2025, 14 pages.

International Application No. PCT/US2025/019406, International Search Report and Written Opinion mailed on Jul. 1, 2025, 9 pages.

International Application No. PCT/US2025/019407, International Search Report and Written Opinion mailed on Jun. 30, 2025, 12 pages.

International Application No. PCT/US2025/019416, International Search Report and Written Opinion mailed on Jun. 20, 2025, 11 pages.

* cited by examiner

TECHNIQUES FOR A KEY MANAGEMENT SERVICE IN AN OVERLAY NETWORK

CROSS-REFERENCES TO RELATED APPLICATIONS

This application claims priority to and the benefit of the following applications, the entire contents of which are hereby incorporated by reference in their entirety for all purposes:

1. U.S. Provisional Patent Application 63/564,195, filed on Mar. 12, 2024, entitled "SCALABLE FOOTPRINT FOR DEDICATED CLOUD TECHNIQUES";
2. U.S. Provisional Patent Application 63/568,061, filed on Mar. 21, 2024, entitled "NETWORKING FOR A SCALABLE DEDICATED CLOUD FOOTPRINT";
3. U.S. Provisional Patent Application 63/568,234, filed on Mar. 21, 2024, entitled "SCALABLE FOOTPRINT FOR DEDICATED CLOUD TECHNIQUES";
4. U.S. Provisional Patent Application 63/633,966, filed on Apr. 15, 2024, entitled "SCALABLE FOOTPRINT FOR DEDICATED CLOUD TECHNIQUES";
5. U.S. Provisional Patent Application 63/637,691, filed on Apr. 23, 2024, entitled "SCALABLE FOOTPRINT FOR DEDICATED CLOUD TECHNIQUES";
6. U.S. Provisional Patent Application 63/660,377, filed on Jun. 14, 2024, entitled "DRCC ARCHITECTURE UPDATE"; and
7. U.S. Provisional Patent Application 63/689,572, filed on Aug. 28, 2024, entitled "TECHNIQUES FOR A KEY MANAGEMENT SERVICE IN AN OVERLAY NETWORK."

BACKGROUND

Cloud service providers (CSPs) can offer computing infrastructure for customers using resources in several data centers. As cloud computing demand increases, CSPs can improve the availability of cloud resources by scaling the data centers. However, scaling can result in large data center footprints with a significant number of computing devices requiring a commensurate amount of resources to operate as well as reserving significant computing resources for the effective management of the cloud resources themselves.

BRIEF SUMMARY

Embodiments of the present disclosure relate to cloud computing networks. More particularly, the present disclosure describes architectures, infrastructure, and related techniques for implementing a key management service in a reduced footprint data center. A typical CSP may provide cloud services to multiple customers. Each customer may have the ability to customize and configure the infrastructure provisioned to support their allocated cloud resources. To manage the infrastructure provisioning for multiple customers, the CSP may reserve computing resources within a data center to provide certain "core" services to both customers and to other services operated by the CSP. For example, services like block storage, object storage, identity and access management, and key management and secrets services are implemented within a "service enclave" of the data center. The service enclave may connect via a substrate network of computing devices (virtual machines and/or bare metal instances) hosted within the data center. The substrate network may be a part of the "underlay network" of the data center, which includes the physical network connecting bare metal devices, smart network interface cards (SmartNICs) of the computing devices, and networking infrastructure like top-of-rack switches. By contrast, CSP customers have infrastructure provisioned in an "overlay network" comprising one or more VCNs of virtualized environments to provide resources for the customer (e.g., compute, storage, etc.).

The service enclave exists on dedicated hardware within the data center. Because of this, the services hosted within the service enclave are difficult to scale. Whereas additional racks and servers can be implemented within the data center to expand the resources available to CSP customers, the dedicated computing resources for the service enclave are typically of a fixed size that depends on the largest predicted size of the data center. Expanding the service enclave can require a complicated addition of computing resources that may impact the availability of the core services to customers. Additionally, unused resources within the service enclave (e.g., if the service enclave is sized too large for the customer demand from the data center) cannot be easily made available to the customers, since the service enclave does not typically allow network access from the customer overlay network.

Even as the demand for cloud services grows, CSPs may want to deploy data centers to meet that demand that initially have the smallest physical footprint possible. Such a footprint can improve the ease of both deploying the physical components and configuring the initial infrastructure while still allowing the data center to scale to meet customer demand. In the reduced footprint, rather than dedicate a portion of the computing hardware to providing the service enclave, the "core services" that are hosted in the service enclave can instead be implemented in the overlay network. By doing so, the core services can be scaled as the data center footprint expands. The computing devices used to construct the reduced footprint data center can be homogenized, improving the initial configuration and the easing the expansion of the footprint when additional, homogeneous devices are added. In addition, by eliminating the substrate network, flexible overlay network shapes are made available for both CSP core services and customers.

One aspect of reducing the footprint of the data center is omitting dedicated hardware devices for particular operations including managing keys (e.g., encryption keys, signing keys, etc.) and other secrets. In a typical data center, a Key Management Service (KMS) can communicate with a dedicated hardware security module (HSM) for performing encryption and decryption operations, performing digital signatures, and storing authenticated hardware keys. The HSM can be configured with root keys for encrypting and signing operations in a key signing ceremony that involves the physical transportation of the HSM keys (e.g., via a memory stick) to a secure facility holding the CSP root of trust keys on an isolated computer. Once the HSM root keys have been signed during the key signing ceremony, the HSM can be implemented in the data center to provide key services that are tied to the CSP root of trust. In a reduced footprint data center, no HSM may be present. Instead, the bare metal computing devices can each have a trusted platform module (TPM) for storing a limited number of authenticated keys. To establish the chain of trust with the secured root keys maintained by the CSP, the reduced footprint data center can be configured to connect to an existing data center and use the HSM of that data center to establish the trust chain for a KMS that is implemented in the reduced footprint data center.

Embodiments described herein relate to methods, systems, and computer-readable media for implementing a KMS in an Overlay network of a reduced footprint data center. A method can include executing a cryptographic service at a computing device of a reduced footprint data center. The method can also include generating, by the cryptographic service, a master encryption key and encrypting the master encryption key to produce an encrypted master encryption key. The cryptographic service can use a secure component of the computing device to encrypt the master encryption key. The method can also include storing the encrypted master encryption key in a block storage volume communicatively connected to the computing device. The method can also include transmitting, by the cryptographic service the master encryption key to a host region data center and receiving a wrapped master encryption key in response. The method can also include storing the wrapped master encryption key in a database of the reduced footprint data center.

Another embodiment is directed to a compute system including one or more processors and one or more memories storing computer-executable instructions that, when executed by the one or more processors, cause the computer system to perform the method described above.

Yet another embodiment is directed to a non-transitory computer-readable medium storing computer-executable instructions that, when executed by one or more processors of a computer system, cause the computer system to perform the method described above.

DETAILED DESCRIPTION

Figure 1:
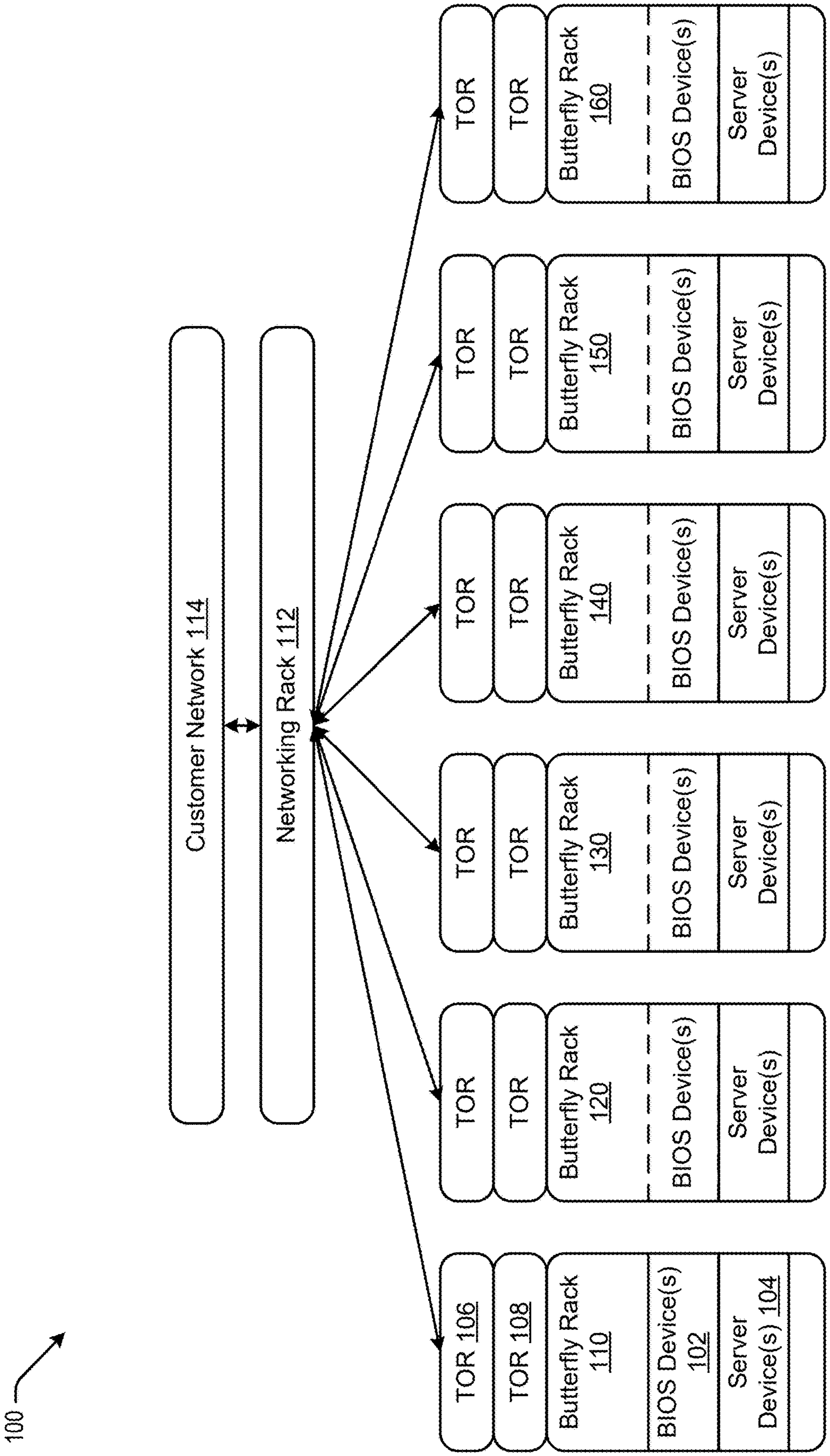
FIG. 1 is a block diagram illustrating an example system architecture of a reduced footprint data center including an initialization device, according to some embodiments.

The adoption of cloud services has seen a rapid uptick in recent times. Various types of cloud services are now provided by various different cloud service providers (CSPs). The term cloud service is generally used to refer to a service or functionality that is made available by a CSP to users or customers on demand (e.g., via a subscription model) using systems and infrastructure (cloud infrastructure) provided by the CSP. Typically, the servers and systems that make up the CSP's infrastructure and which is used to provide a cloud service to a customer are separate from the customer's own on-premises servers and systems. Customers can thus avail themselves of cloud services provided by the CSP without having to purchase separate hardware and software resources for the services. Cloud services are designed to provide a subscribing customer easy, scalable, and on-demand access to applications and computing resources without the customer having to invest in procuring the infrastructure that is used for providing the services or functions. Various different types or models of cloud services may be offered such as Software-as-a-Service (SaaS), Platform-as-a-Service (PaaS), Infrastructure-as-a-Service (IaaS), and others. A customer can subscribe to one or more cloud services provided by a CSP. The customer can be any entity such as an individual, an organization, an enterprise, and the like.

As indicated above, a CSP is responsible for providing the infrastructure and resources that are used for providing cloud services to subscribing customers. The resources provided by the CSP can include both hardware and software resources. These resources can include, for example, compute resources (e.g., virtual machines, containers, applications, processors), memory resources (e.g., databases, data stores), networking resources (e.g., routers, host machines, load balancers), identity, and other resources. In certain implementations, the resources provided by a CSP for providing a set of cloud services CSP are organized into data centers. A data center may be configured to provide a particular set of cloud services. The CSP is responsible for equipping the data center with infrastructure and resources that are used to provide that particular set of cloud services. A CSP may build one or more data centers.

The following definitions are useful for portions of a data center built by a CSP:

Underlay Network—The physical network that sits below the Overlay Network and virtual cloud networks (VCNs) therein. The existing Substrate network is a portion of the Underlay Network. ILOM ports, management and Smart-NIC substrate addresses are also part of the underlay network.

Overlay Network—The network environment that is available for use by executing services and applications, including virtualization environments, that provide the functionality of the data center to both customers and the CSP. The Overlay Network can include VCN(s), virtualization environments, and networking connections from these VCNs in the reduced footprint data center to other cloud computing services of the CSP (e.g., services provided in other data center environments). Specific details about network virtualization and VCNs as part of Infrastructure as a Service are provided below with respect to FIGS. 9-13.

Substrate Network—A portion of the Underlay Network that contains host devices (e.g., bare metal computing devices and/or VMs) running only Substrate Services. In existing environments these host devices may not have SmartNICs. The host devices may be managed by service teams responsible for one or more of the Substrate Services.

Substrate Services—The list of services that currently run in the Substrate Network, while most of these run in Service Enclave (Block Storage, Object Storage, Identity Service etc.) some substrate service live outside of the service enclave. Currently substrate services have a mix of services that must talk to the underlay network (e.g. Network Monitoring) and services that due to historical reasons reside in service enclave (e.g. Object Storage). With the elimination of dedicated substrate host, we expect substrate services to converge into only services that must communicate with the underlay network.

SmartNIC—A computing component that combines a network interface card with additional functionality for network virtualization to create layers of network abstraction that can be run on top of the physical networking components (e.g., the Underlay Network). The SmartNIC can include processors and memory that can perform computing operations to provide the additional functionality.

BIOS Device(s)—A computing device or a plurality of computing devices on a server rack in the reduced footprint data center. The BIOS Device(s) may be designed to enable independent and resilient operations during various boot scenarios and network disruptions. The BIOS Device(s) may be configured to facilitate the initial boot processes for the reduced footprint data center, provide essential services during recovery, and ensure the region's stability, especially in power-constrained environments. The BIOS Device hosts a range of functions, all of which can allow the autonomous operation of the region. For example, these functions can include DNS resolution, NTP synchronization, DHCP/ZTP configuration, and various security and provisioning services. By offering these capabilities, the BIOS Device ensures that the rack can bootstrap itself, recover from power or network-related events, and maintain essential connectivity and management functions without relying on external resources. For example, each server rack can have one BIOS device, or can have two or three BIOS devices. In various embodiments, the BIOS device can have similar hardware specifications (e.g., number of processors, amount of memory, amount of attached storage devices) as other server devices on the rack.

A reduced footprint data center can have a new architecture for a region in which the initial network footprint is as small as feasible (e.g., six racks, four racks, and possibly even a single rack of server devices) while still providing core cloud services and scalability for customer demands. In particular, a reduced footprint data center may not segregate resources for the Service Enclave (SE) from the Customer Enclave (CE). Instead, the Butterfly region will place SE services (e.g., Block Storage, Object Storage, Identity, Key Management, Secrets), which primarily operate in a Substrate Network, into an Overlay Network. This means that a Butterfly region will not have dedicated hosts for the Substrate Network, but will require particular solutions for connectivity with the Substrate services now in the Overlay. In addition, a small portion of fundamental boot services is needed to ensure initial route configuration for the services in the Overlay during startup and/or recovery.

FIGS. 1-4 provide an overview of the concepts embodied by a reduced footprint data center.

FIG. 1 is a block diagram illustrating an example system architecture of a reduced footprint data center 100 including an initialization device 102. As shown in FIG. 1, the reduced footprint data center 100 can include six racks of server devices. The racks may be referred to as "Butterfly" racks. The reduced footprint data center 100 can include Butterfly rack 110, Butterfly rack 120, Butterfly rack 130, Butterfly rack 140, Butterfly rack 150, and Butterfly rack 160. In some embodiments, the racks can be identical. For example, Butterfly rack 110 can include the same number of computing and/or networking devices as each other Butterfly rack 120-160.

Butterfly rack 110 can include two top-of-rack (TOR) switches 106, 108. The TOR switches 106, 108 can each include one or more networking switches configured to provide network communication between the server devices and other computing devices within Butterfly rack 110 as well as one or more networking connections to the other Butterfly racks 120-160 and or other networks including customer network 114.

The Butterfly rack 110 can also include one or more BIOS device(s) 102. The BIOS device can be a server device configured to execute one or more processes to provide a set of "core services" within the reduced footprint data center 100 during startup/boot processes. The BIOS device(s) 102 can configure one or more components of the reduced footprint data center 100 during startup. For example, the BIOS device(s) 102 can send network configuration information to a networking device within the Butterfly racks 110-160. The networking device can be a SmartNIC attached to a server device within the Butterfly racks 110-160. As another example, the BIOS device(s) 102 can send network configuration information to a substrate access VCN. The substrate access VCN can be deployed to one or more hosts within the reduced footprint data center 100. For example, VMs executing in the Butterfly racks 110-160 can be configured to be a substrate access VCN. The substrate access VCN can be configured to provide networking routes between one or more other VCNs (e.g., customer VCNs) and the networking devices (e.g., SmartNICs) and other networking components of the substrate services that now execute in their own VCN in the Overlay.

In some embodiments, the BIOS device(s) 102 can also be configured to host one or more services like a key exchange service (KeS), a device encryption key (DEK) service, or other core services. In addition, the BIOS device(s) 102 can include boot volumes for VMs that are started on host devices in the reduced footprint data center 100. For example, BIOS device(s) 102 can provide boot volumes for VMs on hypervisors hosted on server device(s) 104.

The Butterfly rack 110 can include one or more additional server device(s) 104. The server device(s) 104 can each include one or more processors and one or more memories that together can store and execute instructions for implementing computing services as described herein, including, for example, compute, storage, VMs, CSP services, customer services and/or applications, and the like. As depicted in FIG. 1, each of the Butterfly racks 110-160 can include an identical complement of server device(s) and TORs. In some embodiments, each of the Butterfly racks 110-160 can include a BIOS device, although the techniques described herein can be implemented using only a single BIOS device within the reduced footprint data center 100. Each server device of the server device(s) 104 can include a trusted platform module (TPM). The TPM on each device can be a microcontroller or other processor (or multiple processors) along with storage for performing cryptographical operations like hashing, encryption/decryption, key and key pair generation, and key storage. The TPM may generally conform to a standard characterizing such devices, for example, ISO/IEC 11889.

The reduced footprint data center 100 can also include a networking rack 112. The networking rack 112 can include one or more networking devices including switches, gateways, routers, and the like for communicatively coupling the Butterfly racks 110-160 to each other and to customer network 114. The customer network 114 can include an on-premises network connected to the reduced footprint data center 100. In some embodiments, the customer network 114 can provide network connectivity to a public network, including the Internet. As described below with respect to FIG. 2, the networking rack 112 may not be part of an initial "Small" reduced footprint data center and may be added to support the scaling of the reduced footprint data center 100.

Figure 2A:
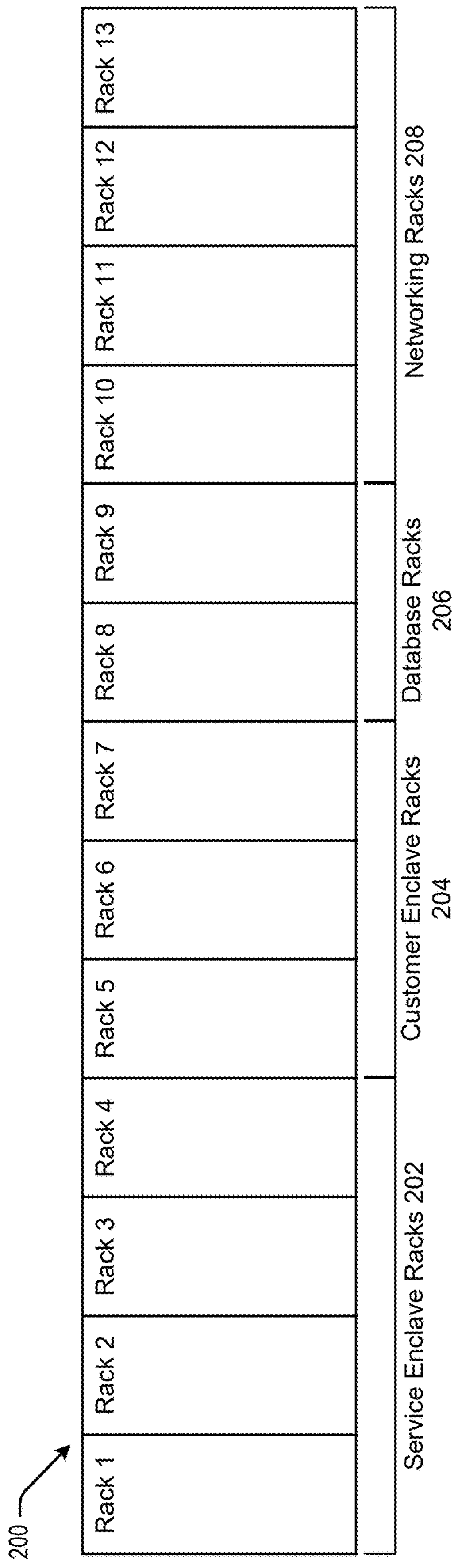
FIG. 2A is a block diagram illustrating a conventional data center including a plurality of server racks reserved for particular functionality.

FIG. 2A is a block diagram illustrating a conventional data center 200 including a plurality of server racks reserved for particular functionality. In a conventional data center 200, the plurality of server racks can each include multiple server devices as well as networking equipment (e.g., TORs) and power supply and distribution equipment. The conventional data center 200 shown in FIG. 2A can have a standard footprint of 13 server racks as shown, although additional server racks are possible in larger data centers.

To provide networking isolation between customer data and CSP data for CSP services executing in the conventional data center 200, a portion of the server racks can be reserved as a service enclave, so that the computing devices on those server racks can host and provide CSP services within the conventional data center 200 without also hosting customer data. As shown in FIG. 2A, server racks 1-4 may be included as service enclave racks 202.

Similarly, a portion of the server racks can be provided as a customer enclave, so that the computing devices on those server racks can host customer services, applications, and associated customer data. Racks 5-7 can be part of the customer enclave racks 204 within conventional data center 200.

The isolation between the service enclave and the customer enclave can be enforced by software-defined perimeters that define edge devices and/or software within the enclave as distinguished from hardware/software elements outside of the enclave. Access into and out of each enclave may be controlled, monitored, and/or policy driven. For example, access to the service enclave may be based on authorization, limited to authorized clients of the CSP. Such access may be based on one or more credentials provided to the enclave.

The conventional data center 200 can also include database racks 206 (racks 8-9) and networking racks 208 (racks 10-13). The database racks 206 can include computing devices and storage devices that provide storage and management for databases, data stores, object storage, and similar data persistence techniques within the conventional data center 200. The networking racks 208 can include networking devices that provide connectivity to the computing devices within conventional data center 200 and to other networks (e.g., customer networks, the internet, etc.).

Figure 2B:
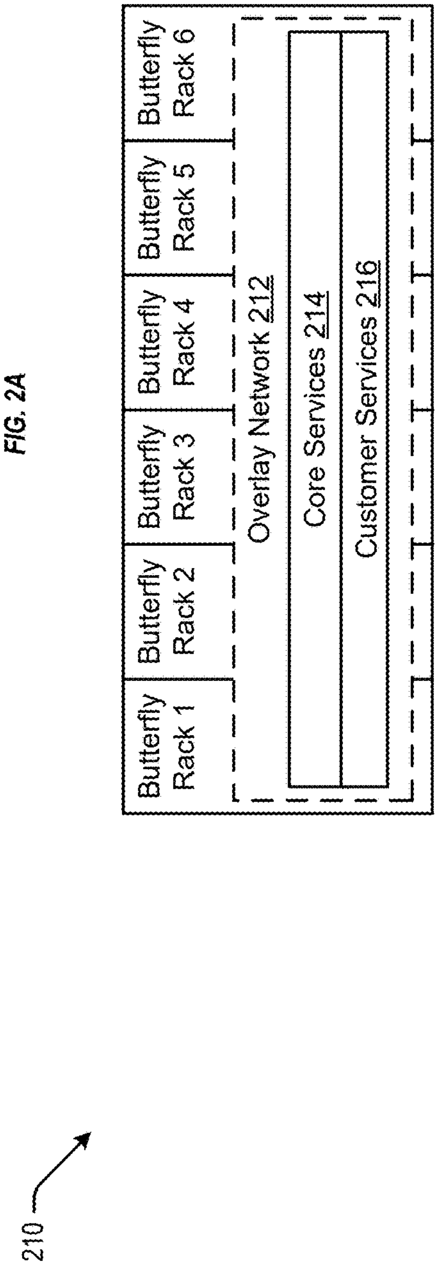
FIG. 2B is a block diagram illustrating a reduced footprint data center in which services are in an overlay network, according to some embodiments.

FIG. 2B is a block diagram illustrating a reduced footprint data center 210 in which services are in an overlay network, according to some embodiments. The reduced footprint data center 210 may be an example of reduced footprint data center 100 of FIG. 1, including six Butterfly racks, each having a plurality of server devices, networking devices, and power distribution devices.

Unlike the conventional data center 200, in which particular server racks are reserved as service enclave racks 202 and customer enclave racks 204, the reduced footprint data center 210 can have an Overlay network 212 that spans computing devices in all of the server racks. For example, server devices on Butterfly Rack 1 and Butterfly Rack 6 can host VMs for a VCN in the Overlay network 212. The Overlay network 212 can then include both core services 214 and customer services 216. The core services 214 can include one or more VCNs for the CSP services that would be hosted within the Service Enclave of conventional data center 200 (e.g., on service enclave racks 202). In the reduced footprint data center 210, the core services 214 can exist in the overlay network 212 on any one or more of the server devices within Butterfly racks. Similarly, customer services 216 can exist in the overlay network 212 on host devices on any of the Butterfly racks. In some embodiments the core services 214 may be hosted on specific devices of the reduced footprint data center. For example, the core services 214 may be hosted on Butterfly racks 1-3, while the customer services 216 may be hosted on Butterfly racks 4-6. In other embodiments, the core services 214 and the customer services 216 may be hosted on any of the Butterfly racks, as depicted in FIG. 2B.

Figure 3:
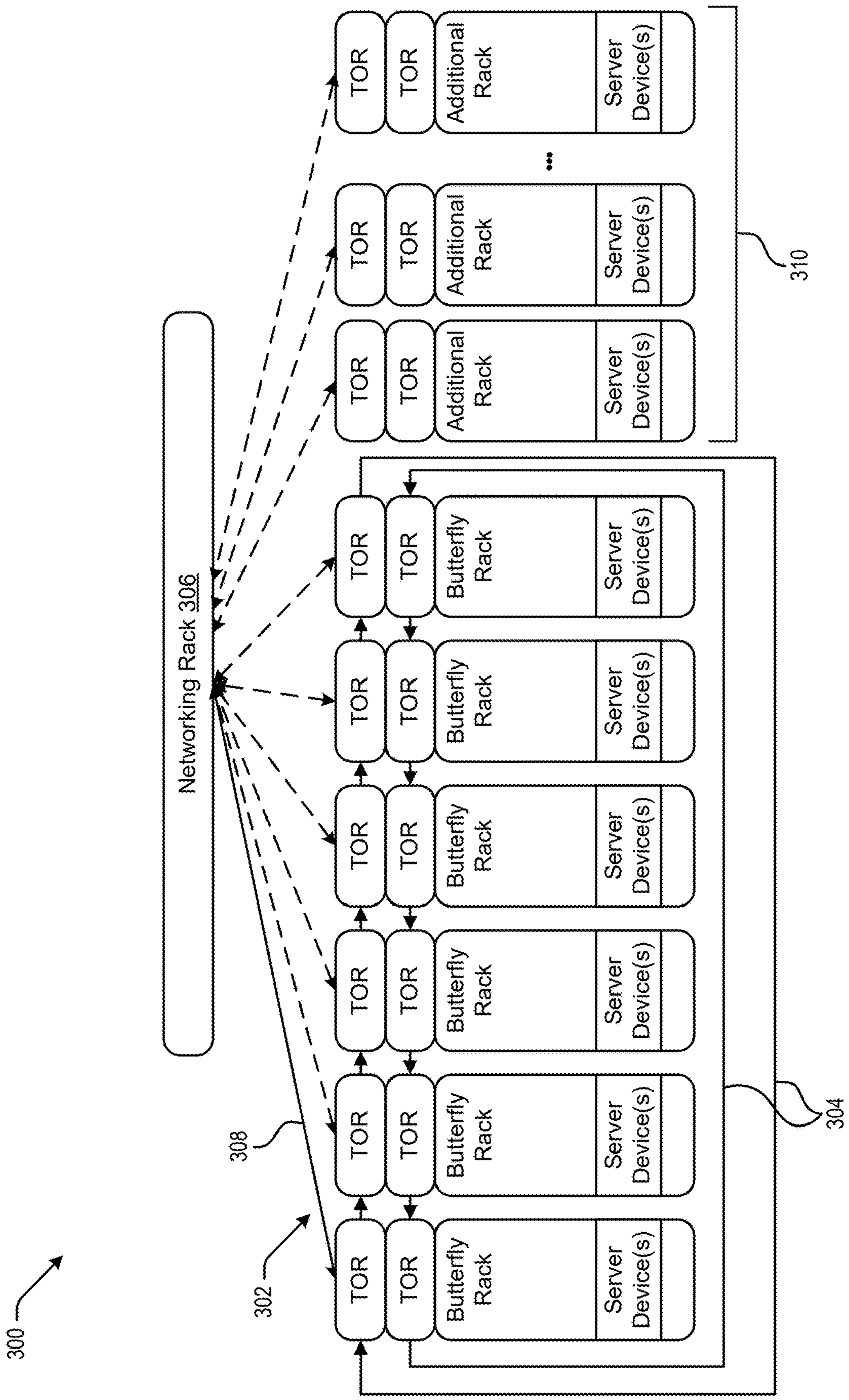
FIG. 3 is a block diagram illustrating the expansion of a reduced footprint data center, according to some embodiments.

FIG. 3 is a block diagram illustrating the expansion of a reduced footprint data center 300, according to some embodiments. The reduced footprint data center 300 can include a plurality of reduced footprint server racks 302. Each of the plurality of reduced footprint server racks 302 can be an example of one of the Butterfly racks 110-160 described above with respect to FIG. 1.

The plurality of reduced footprint server racks 302 can be connected in a ring network 304 using directional network connection between each seat of TOR switches on each of the server racks. For example, a first TOR switch at each rack can be connected to a first TOR switch of two adjacent server racks, such that data communication from the server rack flows in one direction. A second TOR switch at each rack can be connected to a second TOR switch of two adjacent server racks, providing data communication between the racks in the opposite direction. The first TOR switch and the second TOR switch at each rack can be connected to one another and to each server device on the rack, providing multiple, redundant network paths from any server device of any one server rack to another server device on another server rack. The ring network 304 can therefore allow low latency and highly available network connections between resources hosted on any computing device (e.g., server device) in the plurality of reduced footprint server racks 302.

To scale the reduced footprint data center 300 from the initial footprint provided by reduced footprint server racks 302, additional server racks can be connected to the reduced footprint server racks 302. A networking rack 306 can be implemented at the reduced footprint data center 300. The networking rack 306 can be an example of networking rack 112 described above with respect to FIG. 1. The networking rack 306 can include a plurality of networking ports that can be used to connect to one or more of the plurality of reduced footprint server racks. For example, the networking rack 306 can be connected to a first reduced footprint server rack using connection 308. The networking rack 306 can be, for example, a two chassis system having 4 LCs each with 34×400G ports for a total of 384×100G links in each chassis.

Once the networking rack 306 has been implemented and connected, the additional server racks 310 can be installed in the reduced footprint data center 300. The additional server racks 310 can be different from the reduced footprint server racks of the plurality of reduced footprint server racks 302. For example, the additional server racks 310 can include a different number of server devices, with each server device including a different amount of computing and/or storage resources (e.g., processors, processing cores, dynamic memory, non-volatile storage, etc.). Once the additional server racks 310 have been connected to the networking rack 306, a cloud service hosted on the plurality of reduced footprint server racks 302 can be expanded to utilize the computing resources of the additional server racks 310. As one example, a cloud service (e.g., Compute) hosted in the plurality of reduced footprint server racks 302 can have a portion of its data plane provisioned on one of the server devices of the additional server racks 310, thereby allowing the Compute service to instantiate VMs on the additional server racks 310.

Figure 4:
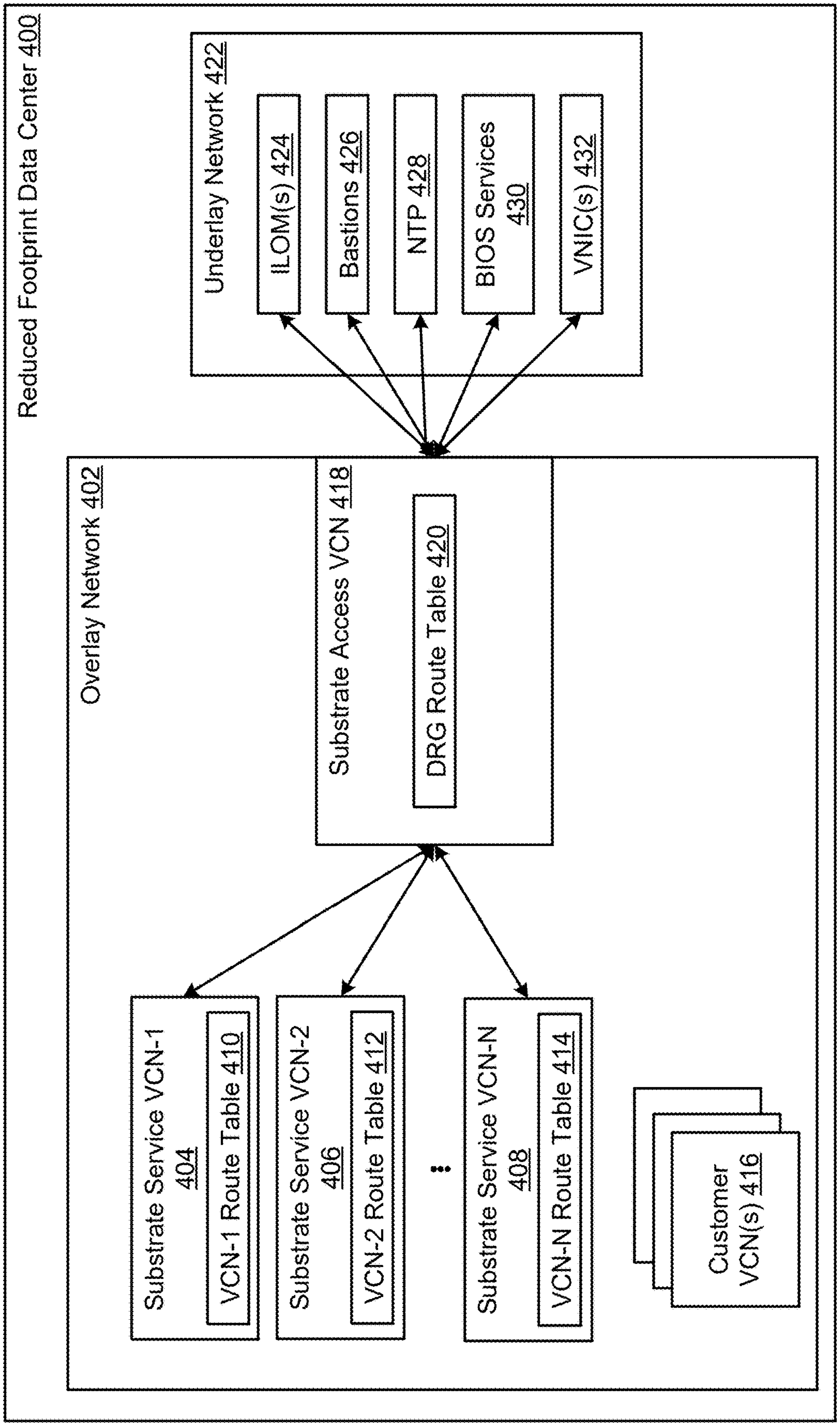
FIG. 4 is a block diagram illustrating networking connections between an overlay network and an underlay network in a reduced footprint data center, according to some embodiments.

FIG. 4 is a block diagram illustrating an example network architecture of networking connections between one or more VCNs (substrate service VCNs) in an Overlay network 402 and the Underlay network 422 in a reduced footprint data center 400, according to some embodiments. The reduced footprint data center 400 can be an example of other reduced footprint data centers described herein, including reduced footprint data center 100 of FIG. 1.

In the reduced footprint data center 400, the CSP services that were previously implemented in the SE (e.g., hosted on service enclave racks 202 of FIG. 2) can now execute in one or more substrate service VCNs 404-408. For example, substrate service VCN-1 404 can be a VCN for a Compute service control plane, substrate service VCN-2 406 can be a VCN for a PKI service, and substrate service VCN-N 408 can be a VCN for a Block Storage service. SE service control and data planes can be separated into different VCNs. The substrate service VCNs 404-408 can exist in the Overlay network 402. The Overlay network 402 can also include customer VCN(s) 416, which can be limited in their connectivity to the Underlay network 422.

Each substrate service VCN can have its own route table that defines the network traffic routing rules for forwarding network traffic within the network of the reduced footprint data center 400. As shown in FIG. 4, substrate service VCN-1 can have VCN-1 route table 410, substrate service VCN-2 can have VCN-2 route table 412, and substrate service VCN-N 408 can have VCN-N route table 414. The routing information of each of the substrate service VCNs 404-408 can be initially configured when the reduced footprint data center 400 is first built so that network traffic to/from the core SE services can be routed between the Overlay network 402 and the Underlay network 422.

The Underlay network 422 can include various devices and other networking endpoints that are connected via the physical networking components of the reduced footprint data center 400. As shown in FIG. 4, the Underlay network 422 can include, without limitation, ILOM(s) 424, Bastions 426, NTP server(s) 428, BIOS services 430, and VNIC(s) 432. The ILOM(s) 424 can be computing devices and network targets that provide access to the server devices of reduced footprint data center 400 for both in-band and out-of-band management. For example, the ILOM(s) 424 can allow for remote management of the associated server devices within the server racks of reduced footprint data center 400 that is separate from the networking pathways defined for the region. The Bastions 426 can be services executing on the server devices of the reduced footprint data center 400 that provide network access via the Underlay network 422 and do not have public network addresses. The Bastions 426 can provide remote access to computing resources within the reduced footprint data center 400 in conjunction with a Bastion service that operates on the Underlay network 422. The Bastion service may be an SE service that is not moved to the Overlay network 402 in the reduced footprint data center 400. Similarly, network time protocol (NTP) servicers 428 may operate in the Underlay network 422 to provide accurate timing to devices and services within the reduced footprint data center 400. BIOS services 430 can include services that are hosted on the one or more initialization devices on the server racks in the reduced footprint data center 400. For example, BIOS services 430 can include a key encryption service usable to encrypt/decrypt data on the server devices of reduced footprint data center 400 during the initial boot process. As another example, the BIOS services 430 can include a network configuration service that can provide the initial network configuration for devices within the reduced footprint data center 400. The VNIC(s) 432 can include network interfaces defined by SmartNICs connected to the server devices within the reduced footprint data center 400.

With SE services moved from to the Overlay network 402, the SE services may still need network connectivity with the Underlay network 422 to properly function. To provide this connectivity, a substrate access VCN 418 can be implemented within the reduced footprint data center 400. The substrate access VCN 418 can include a dynamic routing gateway (DRG) that allows communication between the substrate service VCNs 404-408 and the Underlay network 422. The substrate access VCN 418 can then have a DRG route table 420 that can define a single route rule for reaching the Underlay network 422 from the substrate service VCNs 404-408.

To avoid circular dependencies when the reduced footprint data center 400 is first built or recovers from a shutdown event, an initialization device (e.g., BIOS device 102 of FIG. 1) can be used to configure the network addresses and routes for a substrate access VCN 418, a dynamic route gateway within the substrate access VCN 418, and/or one or more SmartNICs of the Underlay network 422. When the server devices of each reduced footprint data center 400 server racks are booted, the substrate access VCN 418 can be deployed to communicatively connect the one or more substrate service VCNs 404-408 with the Underlay network 422. The initialization device can send network configuration information to the substrate access VCN 418 to configure the DRG route table 420 to provide initial network addresses (e.g., IP addresses) for each endpoint of the substrate service VCNs 404-408 in the Overlay network 402 until a DHCP service and other networking services are available in their respective substrate service VCNs.

In addition, the initialization device can send networking configuration information to define one or more static routes for the dynamic routing gateway as part of the DRG routing table 420. The static routes can characterize a networking connection between the Underlay network 422, including a SmartNIC connected to each server device of the reduced footprint data center (e.g., server device(s) 104 of FIG. 1), and each substrate service VCN 404-408.

Finally, the initialization device can send network configuration information to each of the SmartNICs to provide each SmartNIC a network address (e.g., a network address for the SmartNICs' endpoints in the Underlay network 422). Configuring each of these components of the reduced footprint data center can be done in response to the initialization device receiving indications that the corresponding component has been brought up to an active state (e.g., SmartNIC powered on and reachable over the Underlay network 422, substrate access VCN 418 deployed to one or more hosts within the reduced footprint data center 400, etc.).

Key Management Service in Overlay Network

One of the core service may be a key management service (KMS) that is configured to vend digitally signed keys to applications within the reduced footprint data center. In a typical data center, the KMS can communicate with a hardware security module (HSM) that can be configured, using a manual process by the CSP, with signed root keys that establish the chain of trust with the CSP. When operating in the Overlay, the KMS will run on VMs only. Unlike bare metal hosts, the VMs for KMS in the Overlay may not support an HSM, since the reduced footprint data center may have standardized physical resources (e.g., server devices) without specifically dedicated hardware to support "core" services.

Instead of an HSM, the KMS implemented in a reduced footprint data center can use a trusted platform module (TPM) as the physical security boundary. In contrast to the HSM, the TPM may have a limited storage for keys. For example, a typical TPM on a computing device may be able to store approximately 10 keys for use in various cryptographical operations, while and HSM may be able to store over 100,000 keys. An HSM can therefore provide customers of a typical data center with hardware-secured keys specific to each customer and stored securely at the HSM. Because of the limited space for keys, a KMS in a reduced footprint data center may provide customers with software keys stored encrypted in a database, with the encryption secured ultimately by a key maintained by the TPM.

The HSM in a typical data center is also configured using a key signing ceremony (KSC), in which the public key of the HSM is physically (e.g., on a portable flash drive) brought to a secure facility of the CSP for signing to produce root certificate authority (CA) certificates for the HSM. The resulting signed root CA certificates are physically returned and loaded onto the HSM. To establish this same root trust in a Butterfly region using a TPM, an automatic KSC can be used in which an existing region data center of the CSP that has an HSM (with root trust established via the traditional KSC) can be used as the secure store for the root private keys for the reduced footprint data center. A partition on the HSM can be made for the corresponding reduced footprint data center, and the root key from the HSM can be used to sign a master encryption key (MEK) generated by the KMS in the reduced footprint data center. Since the TPM has limited key storage, a TPM key can be used to encrypt the signed MEK from the host region's HSM. This encrypted, signed MEK can then be stored in a block volume accessible by the KMS VM host.

The communication channel between the reduced footprint data center and the host region can be accomplished using an Application Principal (an instance authenticated and authorized by the host region's identity and access management (IAM) service) in the host region for an AutoKSC application in the reduced footprint data center. The AutoKSC application can communicate with a KMS in the host region to support wrapping/unwrapping (e.g., signing and/or encrypting) of the MEK at the HSM using an HSM agent.

To support the use of the TPM, a new cryptographic module service can execute in KMS in the reduced footprint data center, replacing the functionality of the HSM agent in a typical data center of a CSP. A software intermediate encryption key (IEK) can be used to encrypt all customer keys by KMS in the reduced footprint data center. The IEK can be stored encrypted by the MEK. To support cryptographic operations for customers, the reduced footprint data center KMS can use the TPM to decrypt the stored MEK and load it into memory, then use the MEK to decrypt the stored IEK and load the IEK into memory, then use the IEK to decrypt customer keys to perform the requested operation for the customers.

If the reduced footprint data center scales to a full-sized data center, the TPM-based KMS described above can be migrated to an HSM-based KMS. A bare metal host with an HSM storing keys signed using the traditional KSC can be added to the reduced footprint data center. The HSM root key can be used to encrypt/decrypt the MEK of the KMS operating in the reduced footprint data center, transitioning from the TPM key. Customer software keys can then be imported into the HSM if the customers want hardware keys in the reduced footprint data center. Otherwise, the KMS can operate using the HSM root key to decrypt the MEK as necessary.

Numerous advantages can be realized by removing services from the Substrate. Services teams can eliminate duplicated work (e.g., networking configuration for Underlay and Overlay connectivity), a CSP can completely eliminate some services, compute and storage capacity becomes fungible across all services in the Overlay, and service connectivity is greatly simplified. Services teams can be agnostic about the configuration of their services. If the hosts are provisioned to communicate with the Substrate Access VCN, then the services function as any other customer service. Importantly, a reduced footprint data center does not dedicate a significant fraction of its computing resources to CSP services from the beginning in an unchangeable way. If the CSP services can be scaled down to meet customer needs, the freed resources can be provided to the customer without the need for a physical scale-up. In a complementary way, CSP services can also scale-up in the same way as customer services, since the CSP services now reside in the CE Overlay network. In the particular case of KMS, the techniques described herein allow for a KMS that retains the same security posture and root trust as a conventional data center without the laborious manual key signing process as well as the omission of dedicated HSM equipment in the reduced footprint data center.

Turning now to the figures, FIG. 1 is a block diagram illustrating an example system architecture of a reduced footprint data center 100 including an initialization device 102. As shown in FIG. 1, the reduced footprint data center 100 can include six racks of server devices. The racks may be referred to as "Butterfly" racks. The reduced footprint data center 100 can include Butterfly rack 110, Butterfly rack 120, Butterfly rack 130, Butterfly rack 140, Butterfly rack 150, and Butterfly rack 160. In some embodiments, the racks can be identical. For example, Butterfly rack 110 can include the same number of computing and/or networking devices as each other Butterfly rack 120-160.

Butterfly rack 110 can include two top-of-rack (TOR) switches 106, 108. The TOR switches 106, 108 can each include one or more networking switches configured to provide network communication between the server devices and other computing devices within Butterfly rack 110 as well as one or more networking connections to the other Butterfly racks 120-160 and or other networks including customer network 114.

The Butterfly rack 110 can also include a BIOS device 102. The BIOS device can be a server device configured to execute one or more processes to provide a set of "core services" within the reduced footprint data center 100 during startup/boot processes. The BIOS device 102 can configure one or more components of the reduced footprint data center 100 during startup. For example, the BIOS device 102 can send network configuration information to a networking device within the Butterfly racks 110-160. The networking device can be a SmartNIC attached to a server device within the Butterfly racks 110-160. As another example, the BIOS device 102 can send network configuration information to a substrate access VCN. The substrate access VCN can be deployed to one or more hosts within the reduced footprint data center 100. For example, VMs executing in the Butterfly racks 110-160 can be configured to be a substrate access VCN. The substrate access VCN can be configured to provide networking routes between one or more other VCNs (e.g., customer VCNs) and the networking devices (e.g., SmartNICs) and other networking components of the substrate services that now execute in their own VCN in the Overlay.

In some embodiments, the BIOS device 102 can also be configured to host one or more services like a key exchange service (KeS), a device encryption key (DEK) service, or other core services. In addition, the BIOS device 102 can include boot volumes for VMs that are started on host devices in the reduced footprint data center 100. For example, BIOS device 102 can provide boot volumes for VMs on hypervisors hosted on server device(s) 104.

The Butterfly rack 110 can include one or more additional server device(s) 104. The server device(s) 104 can each include one or more processors and one or more memories that together can store and execute instructions for implementing computing services as described herein, including, for example, compute, storage, VMs, CSP services, customer services and/or applications, and the like. As depicted in FIG. 1, each of the Butterfly racks 110-160 can include an identical complement of server device(s) and TORs. In some embodiments, each of the Butterfly racks 110-160 can include a BIOS device, although the techniques described herein can be implemented using only a single BIOS device within the reduced footprint data center 100. Each server device of the server device(s) 104 can include a trusted platform module (TPM). The TPM on each device can be a microcontroller or other processor (or multiple processors) along with storage for performing cryptographical operations like hashing, encryption/decryption, key and key pair generation, and key storage. The TPM may generally conform to a standard characterizing such devices, for example, ISO/IEC 11889.

The reduced footprint data center 100 can also include a networking rack 112. The networking rack 112 can include one or more networking devices including switches, gateways, routers, and the like for communicatively coupling the Butterfly racks 110-160 to each other and to customer network 114. The customer network 114 can include an on-premises network connected to the reduced footprint data center 100. In some embodiments, the customer network 114 can provide network connectivity to a public network, including the Internet.

Figure 5:
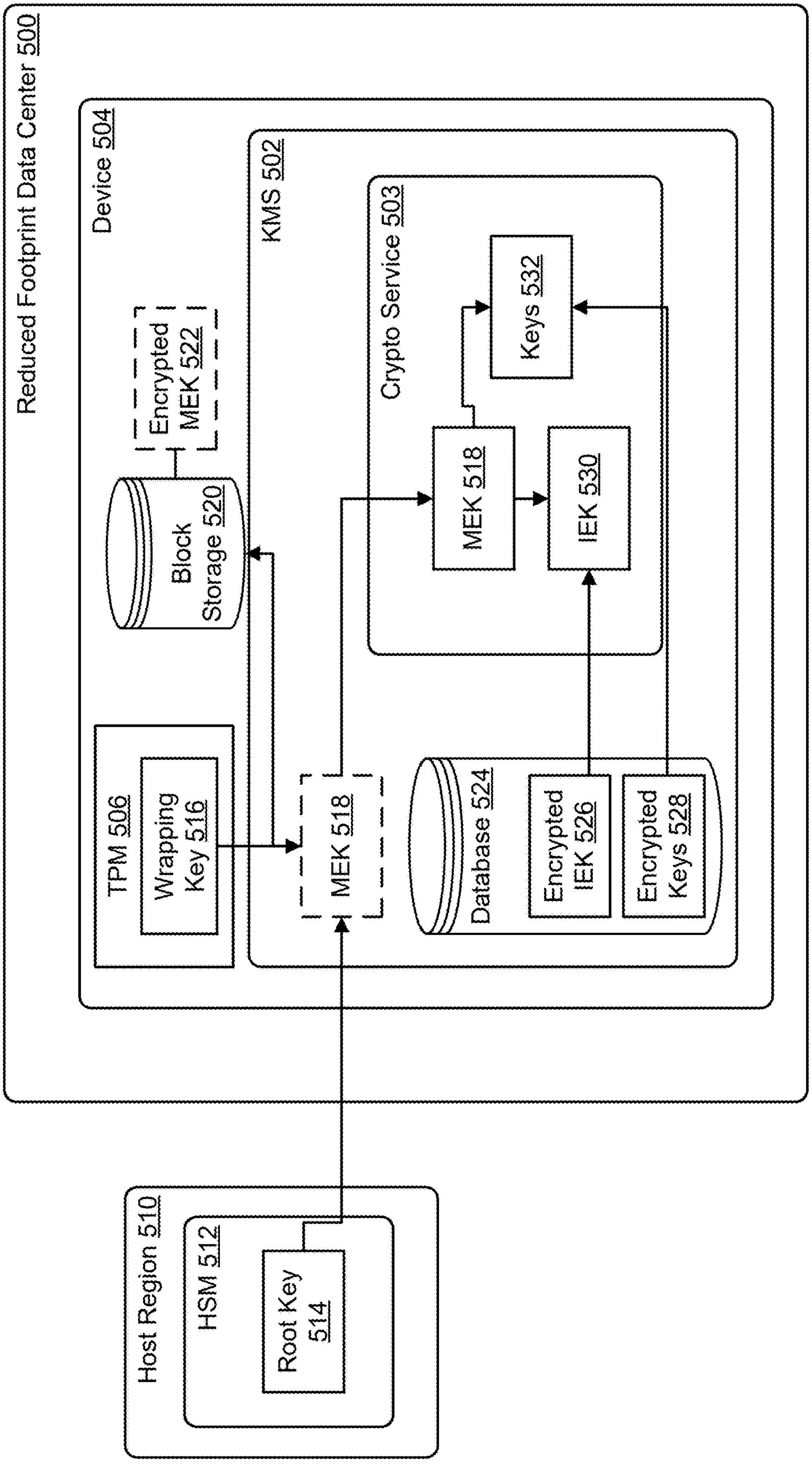
FIG. 5 is a block diagram illustrating an example architecture of a reduced footprint data center hosting a key management service, according to some embodiments.

FIG. 5 is a block diagram illustrating an example architecture of a reduced footprint data center 500 hosting a key management service 502, according to some embodiments. The KMS 502 may be hosted on VMs (not depicted) that are in turn executing on one or more computing devices 504 (e.g., server device(s) 104 of FIG. 1). The computing device 504 can also include a TPM 506 and a block storage 520. The block storage 520 may be one or more storage devices communicatively connected to the computing device 504 such as an non-volatile memory express (NVMe) solid state disks.

The KMS 502 may be configured to execute a cryptographic service 503. The cryptographic service 503 may be one or more processes executing on the VM(s) hosting the KMS 502. The cryptographic service 503 may be configured to perform cryptographic operations like encrypting and decrypting keys and other data in a runtime environment. The memory allocated for the cryptographic service 503 may not be persistent beyond an instance of the cryptographic service 503, so that any keys decrypted by the cryptographic service 503 are not maintained by the KMS 502 in the decrypted state.

The reduced footprint data center 500 may communicate with a host region 510. The host region 510 may be one or more data centers of a CSP. The host region 510 may be a conventionally configured data center with a relatively large footprint of racks and server devices. In particular, the host region 510 can include an HSM 512 that works in conjunction with a KMS of the host region 510. The communication channel between the reduced footprint data center 500 and the host region 510 can be a secure channel established for cross realm communication between different data centers. The HSM 512 can store a root key 514. As described briefly above, the root key 514 may have been signed by a root authority of the CSP in a physical key signing ceremony, thereby establishing the chain of trust between the root key 514 and the root authority of the CSP.

To establish the chain of trust in the reduced footprint data center 500, the KMS 502 can generate a master encryption key (MEK) 518. The MEK 518 can then be transmitted to the host region 510 KMS for a signing and wrapping operation performed by the HSM 512 using the root key 514. As used herein, the term "wrapping" describes a process whereby one key or similar piece of data is encrypted using another key, so that the wrapping key is needed to decrypt the wrapped key. In the example depicted in FIG. 5, two different wrapping/encryption operations can occur. The first is a wrapping by the HSM 512 in the host region 510. The MEK 518 can be wrapped using the root key 514, so that the wrapped MEK is transmitted back to the reduced footprint data center 500. This wrapped (encrypted and signed) MEK can be stored in a database (not shown in FIG. 5) of the reduced footprint data center 500 for the purposes of data recovery and subsequent retrieval and use by the KMS 502 (e.g., if the device 504 fails). The second wrapping operation occurs using the TPM 506 at the reduced footprint data center 500. The signed MEK 518 can be transmitted back to the KMS 502 after which the TPM 506 can wrap the MEK 518 to produce encrypted MEK 522. Encrypted MEK 522 can be stored in the block storage 520. Outside of data recovery operations, the KMS 502 can use the encrypted MEK 522 that is stored in the block storage 520 to perform cryptographic operations in response to requests received in the reduced footprint data center 500.

When needed for a cryptographic operation (e.g., signing a certificate in response to a certificate signing request received from a process executing in the reduced footprint data center 500), the KMS 502 can retrieve the encrypted MEK 522 from the block storage 520. The encrypted MEK 522 can be unwrapped by the TPM 506 using the wrapping key 516 to obtain the MEK 518, which can be maintained in process memory of the cryptographic service 503. The cryptographic operation can require the use of a customer key. Because the reduced footprint data center 500 does not include an HSM, the customer key may not be a hardware-based key stored at an HSM but can instead be a software-based key stored in a database 524 as one of the customer encrypted keys 528. For security, the encrypted keys 528 may be encrypted using an intermediate encryption key (IEK) 526, which is itself encrypted using the MEK 518 while it is stored in the database 524. To use a customer key for a cryptographic operation, the KMS 502 can retrieve the encrypted IEK 526, use the MEK 518 in memory to decrypt the encrypted IEK 526 to produce IEK 530, then use IEK 530 to decrypt one or more of the encrypted keys 528 to produce keys 532, which are also maintained unencrypted only in volatile memory of the cryptographic service 503 during the cryptographic operation.

Figure 6:
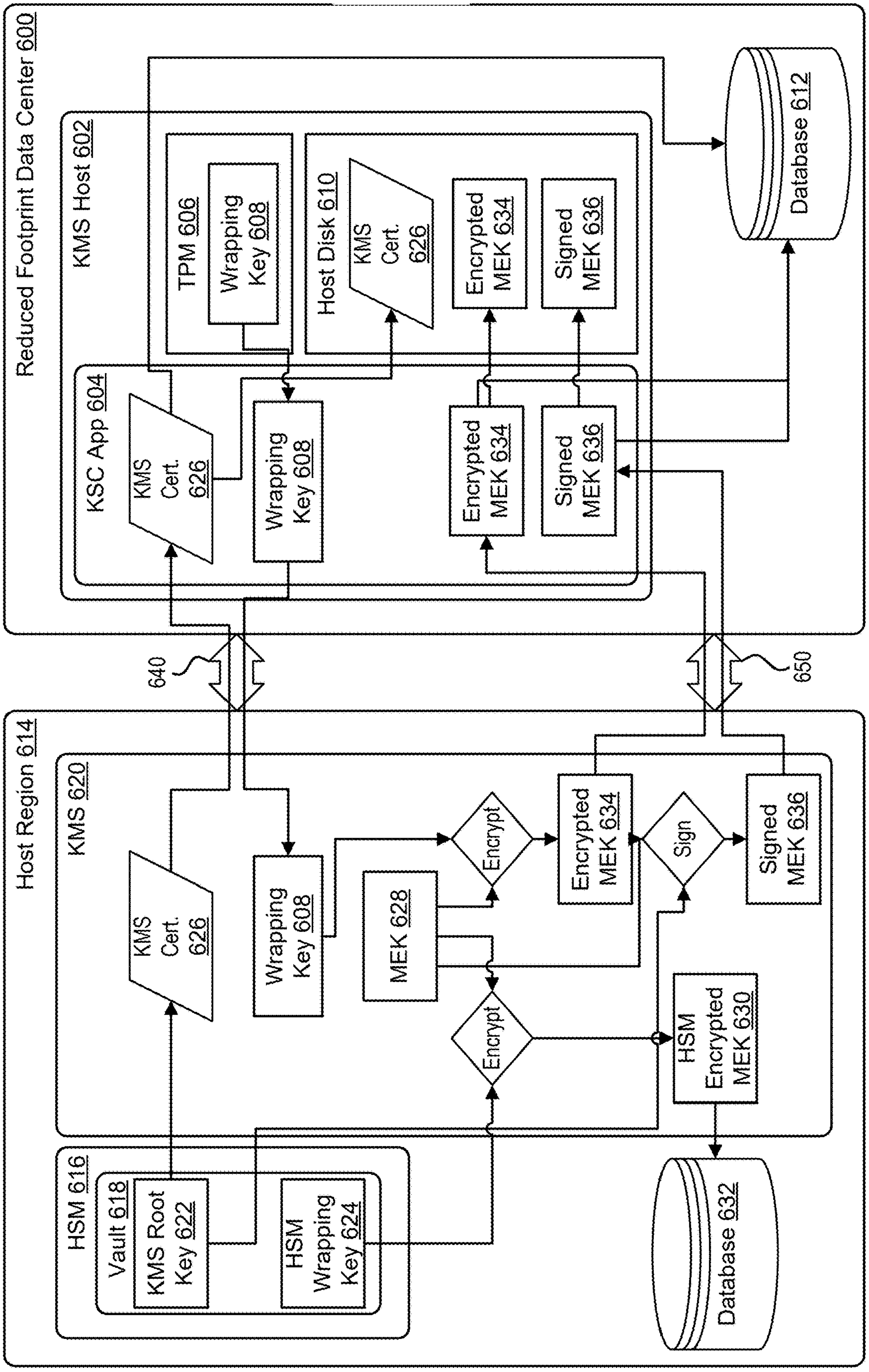
FIG. 6 is a block diagram illustrating an example architecture and simplified flow for a key signing ceremony for a key management service in a reduced footprint data center, according to some embodiments.

FIG. 6 is a block diagram illustrating an example architecture and simplified flow for a key signing ceremony for a key management service in a reduced footprint data center 600, according to some embodiments. The key management service (KMS) may be an example of KMS 502 described above with respect to FIG. 5. The KMS may be hosted on one or more VMs in the reduced footprint data center 600, including KMS host 602. KMS host 602. The bare metal devices hosting the VM can include a TPM that stores a wrapping key used to encrypt ("wrap") various encryption keys used in cryptographic operations performed by the KMS. For example, TPM 606 may store wrapping key 608, which is usable by KMS host 602. In some examples, the wrapping key 608 can correspond to a key pair generated by the TPM 606 that includes both a public wrapping key and a private wrapping key. The private wrapping key may be stored on the TPM 606 and never transmitted out from the TPM 606, while the public wrapping key may be wrapping key 608 described herein and provided to processes, applications, and/or other hosts within reduced footprint data center 600 or another host region for use when performing cryptographic operations. The KMS host 602 can execute a KSC application 604 for performing operations for the key signing ceremony with an existing host region 614.

As discussed above with respect to FIG. 5, an existing host region 614 can include an HSM and related resources for generating key pairs and establishing the root of trust for the reduced footprint data center 600. The host region 614 can include an HSM 616 that has a key vault 618 for storing cryptographic secrets, including KMS root key 622 and HSM wrapping key 624.

In conjunction with the HSM 616, the host region 614 can also host an a KMS instance 620, which can include one or more processes executing on a host device in the host region 614 and configured to perform operations for establishing the root trust at the reduced footprint data center 600. The operations for establishing the root of trust and obtaining an MEK for the reduced footprint data center 600 can be performed in response to a request from the reduced footprint data center 600, for example from KSC application 604. For example, the KMS instance 620 can generate the KMS root key 622 stored in the key vault 618 of the HSM 616. The public key of the KMS root key 622 can be used to generate KMS certificate 626, which can be sent to reduced footprint data center 600 and used as the root of trust with the KMS host 602. The KMS instance 620 can transmit the KMS certificate 626 to the KSC application 604 in the reduced footprint data center 600. The KMS certificate 626 can be used to verify signatures generated by the KMS root key 622 (e.g., private key of the KMS root key pair) from the HSM 616 to establish root trust within the reduced footprint data center 600. Additionally, the KMS instance 620 can be configured to generate an MEK 628 and to perform cryptographic wrapping and unwrapping operations of the MEK 628 on behalf of the reduced footprint data center 600. After generating the MEK 628, the KMS instance 620 can us the HSM wrapping key 624 to encrypt the MEK 630 to produce an HSM encrypted MEK 630, a encrypted copy of the original MEK 628 that is accessible only via the HSM 616. The HSM encrypted MEK 630 may then be stored in a database 632 of the host region 614 for subsequent use by the KMS instance 620.

The KMS instance 620 can receive the wrapping key 608 (e.g., the public wrapping key of TPM 606 in the reduced footprint data center 600) from the KSC application 604. The KMS instance 620 can then encrypt MEK 628 to produce encrypted MEK 634. The KMS instance 620 can also have the MEK 628 signed using the KMS root key 622 to produce a signed MEK 636, which can be a cryptographic signature that can be verified using the KMS certificate 626. The encrypted MEK 634 and signed MEK 636 can be transmitted to the KSC application 604. After receiving the KMS certificate 626, the encrypted MEK 634, and the signed MEK 636, the KSC application 604 can store the KMS certificate 626, the encrypted MEK 634, and the signed MEK 636 on a host disk 610 of the KMS host 602, as well as in a database 612 of the reduced footprint data center 600.

The example architecture depicted in FIG. 6 provides additional detail for the KMS described above in FIG. 5. In particular, cross-realm communication channels 640, 650 are shown for transmitting the wrapping key 608 from the KMS host 602 to the KMS instance 620 and for transmitting the KMS certificate 626 to the KMS host 602 and for providing the signed MEK 636 and encrypted MEK 634 to the reduced footprint data center 600. The cross-realm communication channels 640, 650 may provide a secure communication channel for transmitting the various cryptographic material to the reduced footprint data center 600.

Figure 7:
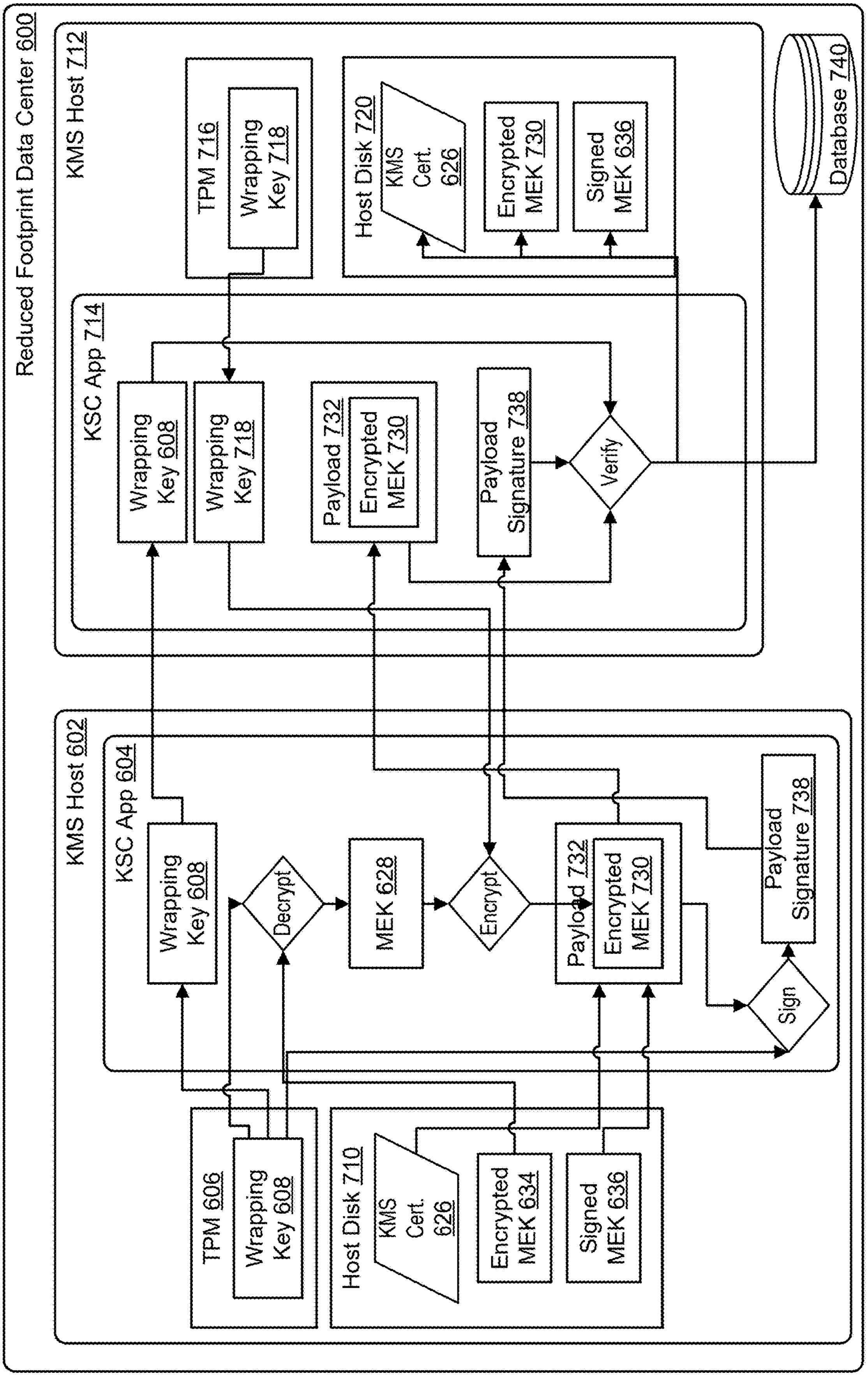
FIG. 7 is a block diagram illustrating an example architecture and simplified flow for a host to host key transfer in a reduced footprint data center, according to some embodiments.

FIG. 7 is a block diagram illustrating an example architecture and simplified flow for a host to host key transfer in the reduced footprint data center 600 described above with respect to FIG. 6, according to some embodiments. After KMS host 602 in the reduced footprint data center obtains the KMS certificate 626, the encrypted MEK 634, and the signed MEK 636, the KMS host 602 can transfer these cryptographic materials to another KMS host (e.g., KMS host 712) in the reduced footprint data center 600 in a way that preserves the root trust established with KMS certificate 626 and allows the KMS host 712 to encrypt the keys using a wrapping key 718 provided within TPM 716 accessible to KMS host 712.

To perform the key transfer operations, the KMS host 602 can use KSC application 604 and KMS host 712 can use KSC application 714 to perform encryption/decryption operations (e.g., wrapping/unwrapping) of the existing keys at KMS host 602 and provide them to KMS host 712 to be verified using the KMS certificate 626 and encrypted using the wrapping key 718. KSC application 714 can obtain wrapping key 718 (the public key of the wrapping key pair) from TPM 716 and provide the wrapping key 718 to KSC application 604. KSC application can similarly obtain wrapping key 608 (the public key of the wrapping key pair) from TPM 606 and provide it to KSC application 714. The KSC application 604 can then retrieve encrypted MEK 634 and decrypt it using wrapping key 608 to recover the plaintext MEK 628. The KSC application 604 can then use wrapping key 718 (from KMS host 712) to encrypt MEK 628 to produce encrypted MEK 730, which can only be decrypted with TPM 716 at KMS host 712. The KSC application 604 can include the encrypted MEK 730 into a payload 732 that also includes KMS certificate 626 and signed MEK 636. The payload 732 can then be signed using the private key of the wrapping key pair in TPM 606 to produce a payload signature 738, which can subsequently be verified using the wrapping key 608 (the public key of the wrapping key pair). The KSC application 604 can then transmit the payload 732 and the payload signature 738 to the KSC application 714 at KMS host 712.

Once the payload 732 and payload signature 738 are received by KSC application 714, KSC application 714 can use wrapping key 608 to verify the payload 732. The payload 732 can first be verified by verifying the payload signature 738 using wrapping key 608. If that verification is successful, the KSC application 714 can then verify the signed MEK 636 using the KMS certificate 626 in the payload 732 and the wrapping key 718 (to retrieve the MEK 628 data). If the verifications are successful, the KSC application 714 can store the KMS certificate 626, the encrypted MEK 730, and the signed MEK 636 in a host disk 720 and a database 740 of the reduced footprint data center 600. In some examples, database 740 may be the same as database 612 of FIG. 6.

Figure 8:
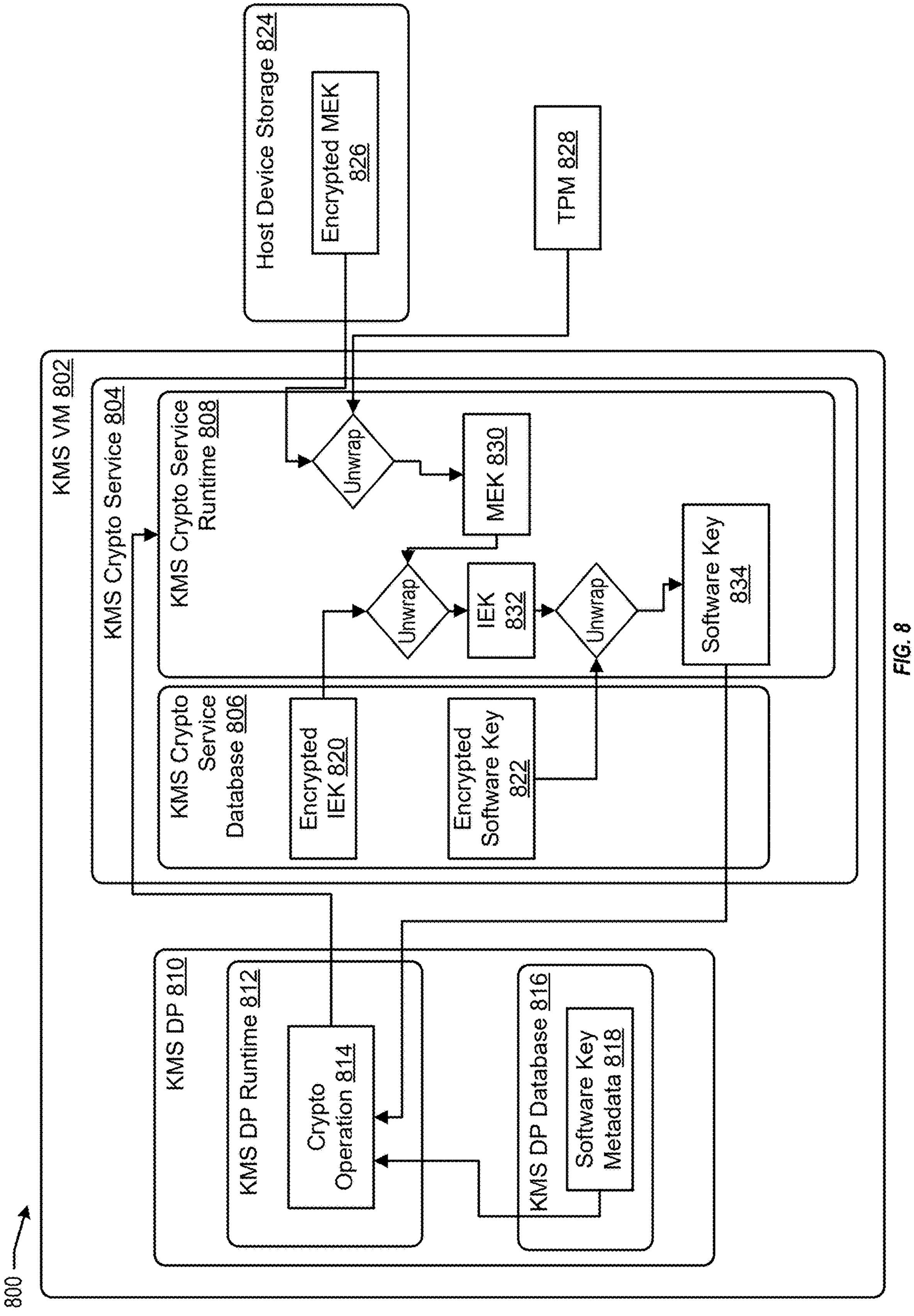
FIG. 8 is a block diagram illustrating a simplified flow for performing a cryptographic operation with a key management service, according to some embodiments.

FIG. 8 is a block diagram illustrating a simplified flow for performing a cryptographic operation 800 with a key management service, according to some embodiments. The KMS may be an example of KMS 502 of FIG. 5. The KMS may be hosted by a VM, including KMS VM 802 within an reduced footprint data center (e.g., reduced footprint data center 600 of FIG. 6). The KMS can include a KMS data plane 810 and a KMS cryptographic service 804. The KMS cryptographic service 804 may be one or more processes that are configured to perform cryptographic operations, including unwrapping one or more keys, in response to requests from other services in the reduced footprint data center.

A request for a cryptographic operation 814 can be received at the KMS data plane 810 in KMS DP runtime memory 812. For example, the cryptographic operation 814 can be a request to encrypt data using a software key (e.g., software key 834) managed by the KMS. In response to the request, the KMS data plane 812 can retrieve software key metadata 818 that identifies the corresponding software key 834 for the request. For example, the request can include information identifying a customer of the CSP, so that the KMS data plane 810 can retrieve software key metadata 818 for the keys corresponding to the customer. The KMS cryptographic service 804 can then retrieve the encrypted MEK 826 from the host device storage 824 (e.g., database 632 of FIG. 6) and have the TPM 828 decrypt it to produce the MEK 830. The operations that decrypt keys into plaintext keys can occur in KMS cryptographic service runtime memory 808 so that plaintext keys are not stored in non-volatile storage in the reduced footprint data center. The KMS cryptographic service 804 can then retrieve the encrypted IEK 820 from KMS cryptographic service database 806 and use the MEK 830 to decrypt the encrypted IEK 820 to produce the IEK 832. The KMS cryptographic service 804 can then determine the encrypted software key 822 in the KMS cryptographic service database 806 that corresponds to the software key metadata 818 and use the IEK 832 to decrypt the encrypted software key 822 to produce the software key 834. Once the software key 834 is available, the KMS cryptographic service 804 can perform the requested cryptographic operation 814 and provide the output to the requesting entity.

Figure 9:
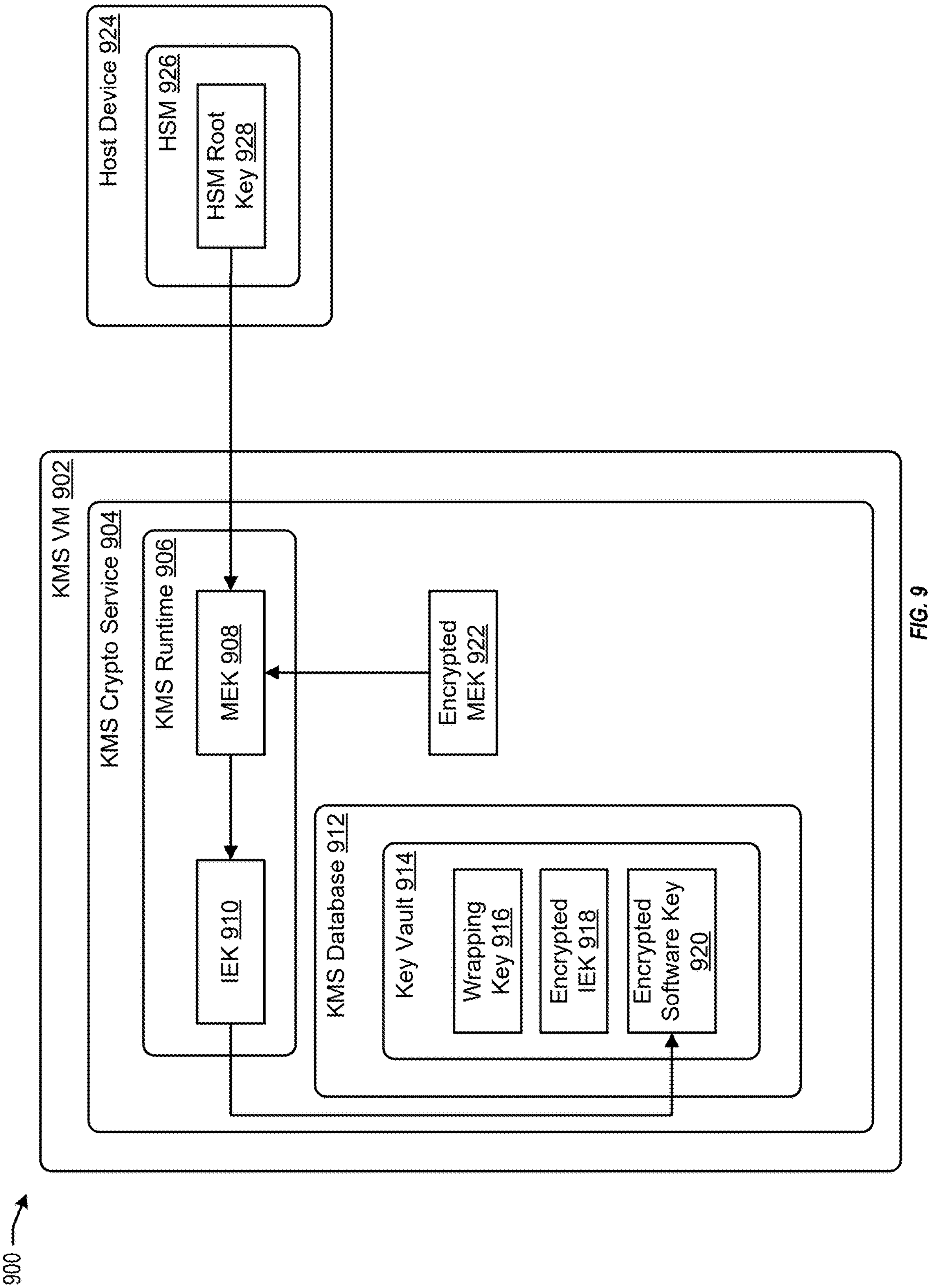
FIG. 9 is a block diagram illustrating a simplified flow for migrating a key management service from a trusted platform module support to a hardware security module support, according to some embodiments.

FIG. 9 is a block diagram illustrating a simplified flow for migrating a key management service (e.g., KMS 502 of FIG. 5) from a trusted platform module support to a hardware security module support, according to some embodiments. The KMS may be hosted on one or more VMs, including KMS VM 902 in a reduced footprint data center (e.g., reduced footprint data center 600 of FIG. 6). As described above with respect to FIG. 9, the KMS VM 902 can include a KMS cryptographic service 904 configured to perform cryptographic operations of the KMS. The KMS cryptographic service 904 can include both runtime memory (e.g., KMS runtime memory 906) and persistent memory (KMS database 912). The KMS runtime memory 906 can store plaintext keys produced during cryptographic operations when unwrapping the various keys described herein.

If the reduced footprint data center expands to an extent for which hardware-based key management is feasible, the KMS in the reduced footprint data center can be migrated from using a TPM (e.g., TPM 506 of FIG. 5) to secure software keys to an HSM to secure and store hardware-based keys. To perform the migration, a bare metal host device 924 that includes an HSM 926 can be connected to the reduced footprint data center. The HSM 926 can be configured with an HSM root key 928 that is signed by the root authority of the CSP using the manual key signing process described above. Once the HSM 926 and the bare metal host device 924 are connected, the KMS VM 902 can obtain the MEK 908 by decrypting the encrypted MEK 922 using the TPM, then encrypting it with the HSM root key 928. The MEK 908 can then be used to unwrap the encrypted IEK 918 to produce the IEK 910, which in turn can be used to wrap/unwrap software keys, including encrypted software key 920. The keys can be stored in a key vault 914 of the KMS database 912, including wrapping key 916, encrypted IEK 918, and encrypted software key 920. In this way, the HSM 926 replaces the functionality of the TPM at the host device of the KMS. If a customer chooses, the encrypted software keys 920 can be migrated to the HSM 926 for storage. For example, the encrypted software key 920 can transmitted to the HSM 926 and stored in a key vault of the HSM 926.

Figure 10:
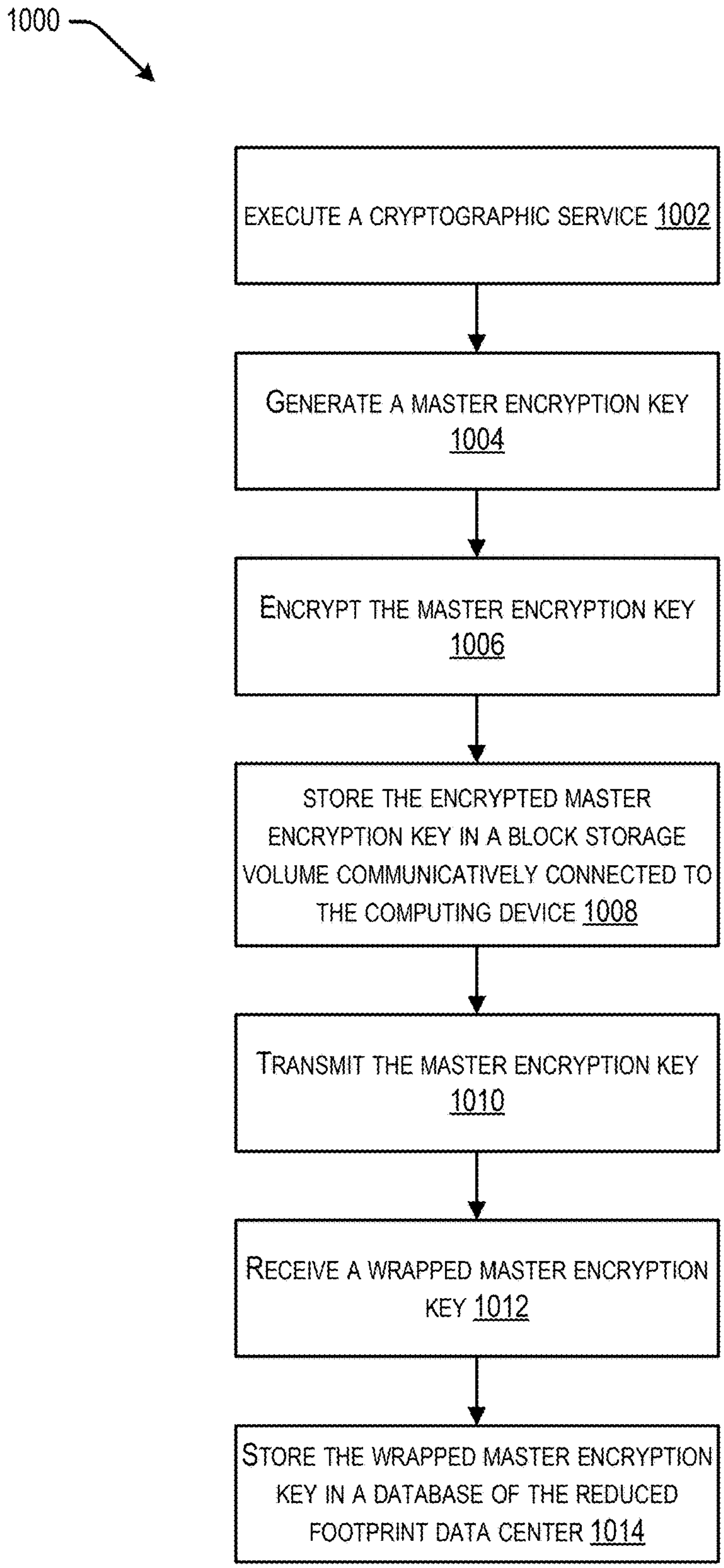
FIG. 10 is a flow diagram of an example process for implementing a key management service in a reduced footprint data center, according to some embodiments.

FIG. 10 is a flow diagram of an example process 1000 for implementing a key management service in a reduced footprint data center, according to some embodiments. The process can be performed by components of the reduced footprint data center (e.g., reduced footprint data center 100 of FIG. 1), including one or more computing devices like server device(s) 104 of FIG. 1. The KMS may be an example of KMS 502 of FIG. 5.

The process 1000 can begin at block 1002 with a computing device of the reduced footprint data center executing a cryptographic service. For example, the cryptographic service can be a process initiated by a KMS running in the reduced footprint data center. The cryptographic process can be configured to perform one or more cryptographic operations on data including, but not limited to, encryption, decryption, hashing, generating keys or key pairs, and generating digital signatures. The cryptographic service may be executed in response to a request or other triggering event received by the KMS.

At block 1004, the cryptographic service can generate a master encryption key (MEK). The MEK can be a cryptographic key usable for cryptographic operations including key wrapping (e.g., encrypting).

At block 1006, the cryptographic service can encrypt the master encryption key to produce an encrypted master encryption key. For example, the cryptographic service can use a wrapping key stored by the secure component to encrypt the MEK. In some embodiments, the secure component is a trusted platform module (TPM). The encryption operations may be performed at the TPM.

At block 1008, the cryptographic service can store the encrypted MEK in a block storage volume communicatively connected to the computing device. For example, the encrypted MEK can be stored on an NVMe solid state disk attached to the computing device.

At block 1010, the cryptographic service can transmit the MEK (generated in the operations of block 1004) to a host region data center. The host region data center may be an existing data center associated with a CSP. The host region data center can include a hardware security module (HSM) configured to perform cryptographic operations using one or more root keys stored at the HSM and signed with a root authority key secured by the CSP (e.g., at a physically secure location). The host region data center can host its own KMS that used the HSM as the secure repository of its root keys. The host region data center KMS can sign and/or encrypt the MEK (e.g., wrap the MEK). In some embodiments, transmitting the MEK to the host region data center comprises transmitting the MEK using a cross-realm communication channel established using identity data corresponding to the cryptographic service. The identity data can be generated in the host region data center.

At block 1012, the cryptographic service can receive a wrapped master encryption key from the host region data center. The wrapped MEK can be encrypted using a root key maintained at the host region data center. In some embodiments, the wrapped MEK is generated by a hardware security module of the host region data center by encrypting the master encryption key using a root encryption key to produce a second encrypted master encryption key and signing the second encrypted master encryption key with a root signing key.

At block 1014, the cryptographic service can store the wrapped MEK in a database of the reduced footprint data center.

In some embodiments, the cryptographic service can determine that a second computing device of the reduced footprint data center does not have the MEK. The cryptographic service can then obtain the encrypted MEK and decrypt the encrypted MEK using the secure component of the computing device. The cryptographic service can then transmit the MEK to the second computing device using a secure communication channel. A cryptographic service executing at the second computing device can use a second secure component of the second computing device to encrypt the MEK to produce a second encrypted MEK. The second encrypted MEK can be stored in a second block storage volume communicatively connected to the second computing device. In some embodiments, the secure communication channel can include a mutual transport layer security (mTLS) channel.

In some embodiments, cryptographic service can receive an indication that a data recovery process has started. In response to the indication, the cryptographic service can retrieve the wrapped master encryption key from the database and transmit the wrapped master encryption key to the host data center. The host data center KMS can authenticate and decrypt the wrapped MEK using a hardware security component of the host data center to produce the MEK. The cryptographic service can then receive the MEK from the host data center.

Figure 11:
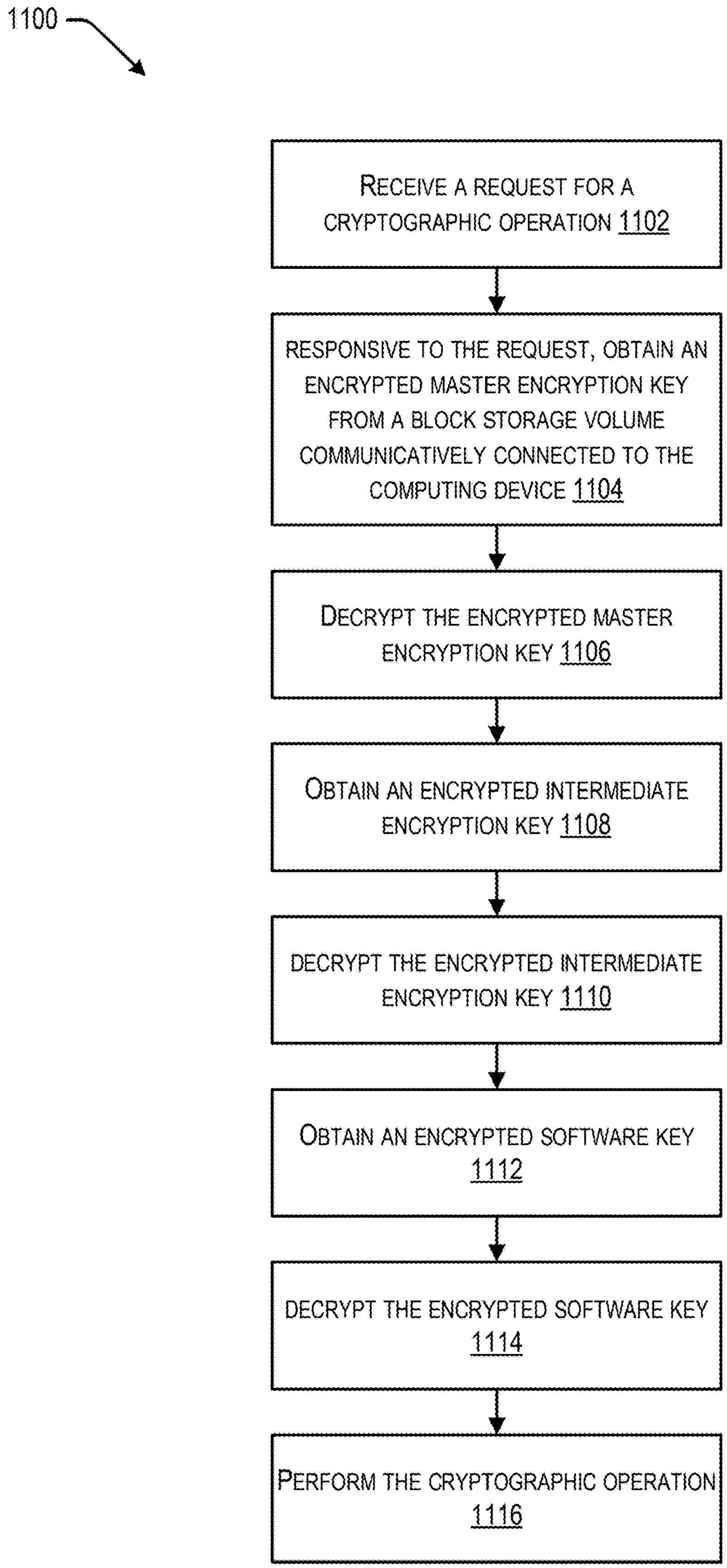
FIG. 11 is a flow diagram of an example process for performing a cryptographic operation using a key management service in a reduced footprint data center, according to some embodiments.

FIG. 11 is a flow diagram of an example process 1100 for performing a cryptographic operation using a key management service in a reduced footprint data center, according to some embodiments. The process 1100 can be performed by components of the reduced footprint data center (e.g., reduced footprint data center 100 of FIG. 1), including one or more computing devices like server device(s) 104 of FIG. 1.

The process 1100 can begin at block 1102 with a key management service (e.g., KMS 502 of FIG. 5) receiving a request for a cryptographic operation. For example, a customer of the CSP using the reduced footprint data center can request a certificate signed using a customer key stored and maintained by the KMS in the reduced footprint data center. In some embodiments, the cryptographic operation comprises an encryption operation of tenant data (e.g., encrypting tenant data received with the request). In some embodiments, the cryptographic operation comprises a signing operation for tenant data (e.g., generating a digital signature using tenant data received with the request).

At block 1104, the KMS can obtain an encrypted MEK from a block storage volume. The block storage volume can be communicatively connected to the computing device. For example, the block storage volume can be a volume on an NVMe storage device of the computing device (e.g., a solid state disk drive). The KMS can obtain the encrypted MEK in response to the request.

At block 1106, the KMS can decrypt the encrypted MEK to produce the MEK. The KMS can use a secure component of the computing device to decrypt the encrypted MEK. For example, the secure component can be a TPM storing a wrapping key. The TPM can use the wrapping key to decrypt the encrypted MEK (e.g., in instances where the MEK was encrypted using the wrapping key to produce the encrypted MEK).

At block 1108, the KMS can obtain an encrypted IEK. The encrypted IEK can be stored in a database accessible to the KMS. The IEK may be another encryption key usable by the KMS for encrypting/decrypting software keys maintained by the KMS. The encrypted IEK may be stored in the same database used to store other software keys maintained by the KMS, including encrypted customer keys. The encrypted IEK may be encrypted using the MEK.

At block 1110, the KMS can use the MEK to decrypt the encrypted IEK to produce the IEK.

At block 1112, the KMS can obtain an encrypted software key from the database. The KMS can use the request to identify the encrypted software key. For example, the KMS can use the request to obtain metadata associated with a tenant transmitting the request (e.g., a customer of the reduced footprint data center). The metadata can associate stored, encrypted software keys with the customer and the request, thereby allowing the KMS to determine a particular encrypted software key to retrieve from the database. In some embodiments, the KMS can obtain the software key metadata from an additional database based on the request.

At block 1114, the KMS can decrypt the encrypted software key to produce a software key. The KMS can use the IEK to decrypt the encrypted software key.

At block 1116, the KMS can then perform the cryptographic operation using the software key. For example, the KMS can generate a digital signature using the software key for data received as part of the request. In some embodiments, the KMS can transmit an output of the cryptographic operation to a tenant application executing in the reduced footprint data center. For example, the tenant application may be a process executing on a Compute VM in the reduced footprint data center. The tenant application can send the request for a digital signature (e.g., a certificate signing request) for use internally within the tenant application. The cryptographic operation can then include the KMS signing the data using the tenant software key and transmit the signature to the tenant application.

Figure 12:
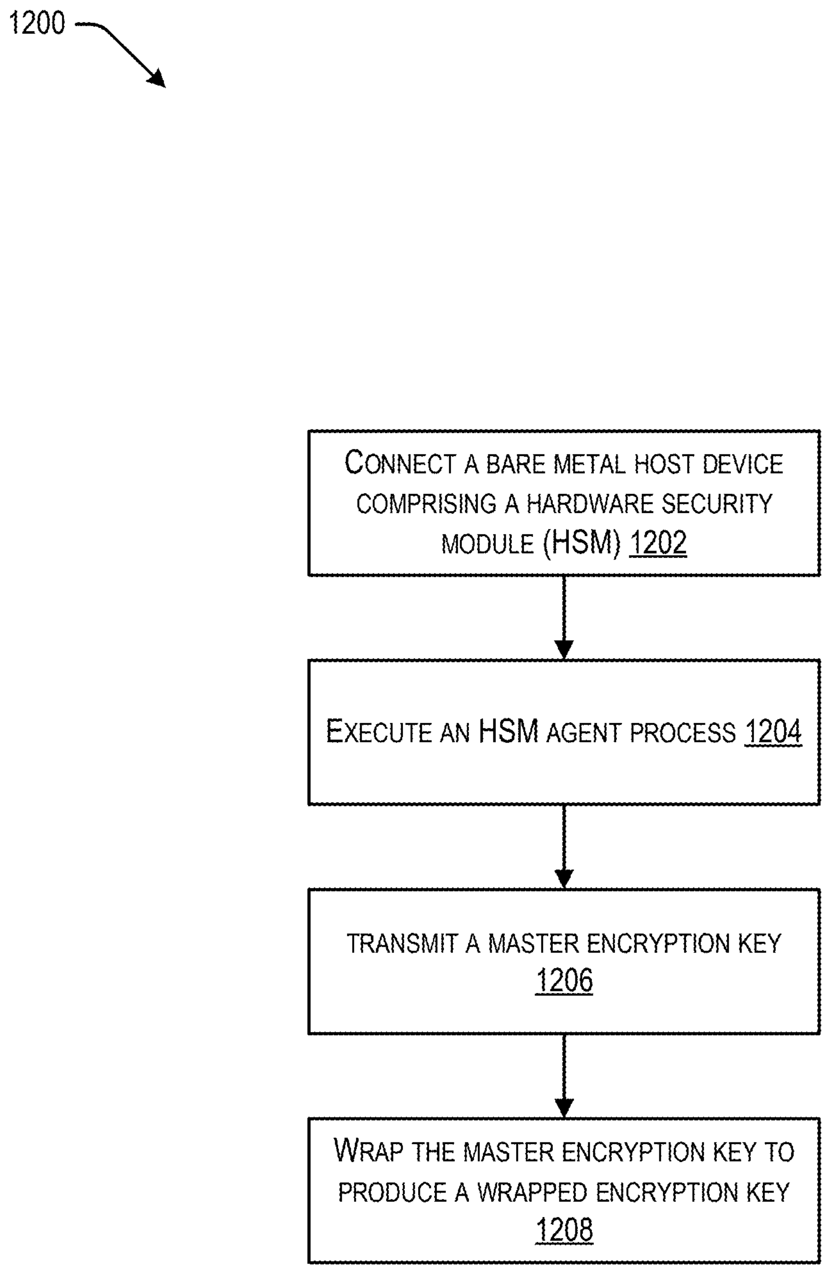
FIG. 12 is a flow diagram of an example process for migrating a key management service in a reduced footprint data center, according to some embodiments.

FIG. 12 is a flow diagram of an example process for migrating a key management service in a reduced footprint data center, according to some embodiments. The process 1200 can be performed by components of the reduced footprint data center (e.g., reduced footprint data center 100 of FIG. 1), including one or more computing devices like server device(s) 124 of FIG. 1 and/or KMS 502 of FIG. 5.

The process 1200 can begin at block 1202 with a bare metal host device connected to the reduced footprint data center. The bare metal host device can include a hardware security module (HSM). For example, a new server device including the HSM can be installed at a server rack in the reduced footprint data center as part of a footprint expansion operation to scale the available resources of the reduced footprint data center out to support additional cloud service functions. The HSM can be configured using a key signing ceremony. For example, the HSM can include a root encryption key and a root signing key that are signed using a root authority secured by a CSP.

At block 1204, the bare metal host device can execute an HSM agent process. The HSM agent process can be a program or application executing at the bare metal computing device or at the HSM itself. The HSM agent process can be configured to perform operations using the processors and memory of the HSM. For example, the HSM agent process can use the HSM to perform cryptographic operations using the cryptographic processors and stored keys of the HSM.

At block 1206, the KMS can transmit a MEK to the HSM agent process. For example, the KMS executing at one or more host devices in the reduced footprint data center can establish a secure connection to the bare metal host device (e.g., via the Underlay network) to transmit the MEK.

At block 1208, the HSM agent can wrap the MEK to produce a wrapped MEK. The wrapped MEK can be an encrypted MEK using the root key of the HSM to perform the encryption of the MEK. In some embodiments, wrapping the master encryption key signing the encrypted master encryption key with a root signing key maintained by the HSM.

In some embodiments, prior to transmitting the MEK, the KMS can an encrypted MEK from a block storage volume communicatively connected to a computing device of the reduced footprint data center. The KMS can then decrypt the encrypted MEK using a secure component of the computing device.

In some embodiments, the HSM agent process can store the wrapped encryption key. In some embodiments, the KMS can store one or more software encryption keys at the HSM. The one or more software encryption keys can be obtained from a database by the KMS.

Example Infrastructure as a Service Architectures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model may require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed may need to first be set up. In some instances, the provisioning can be done manually, a provisioning tool may be utilized to provision the resources, and/or deployment tools may be utilized to deploy the code once the infrastructure is provisioned.

Figure 13:
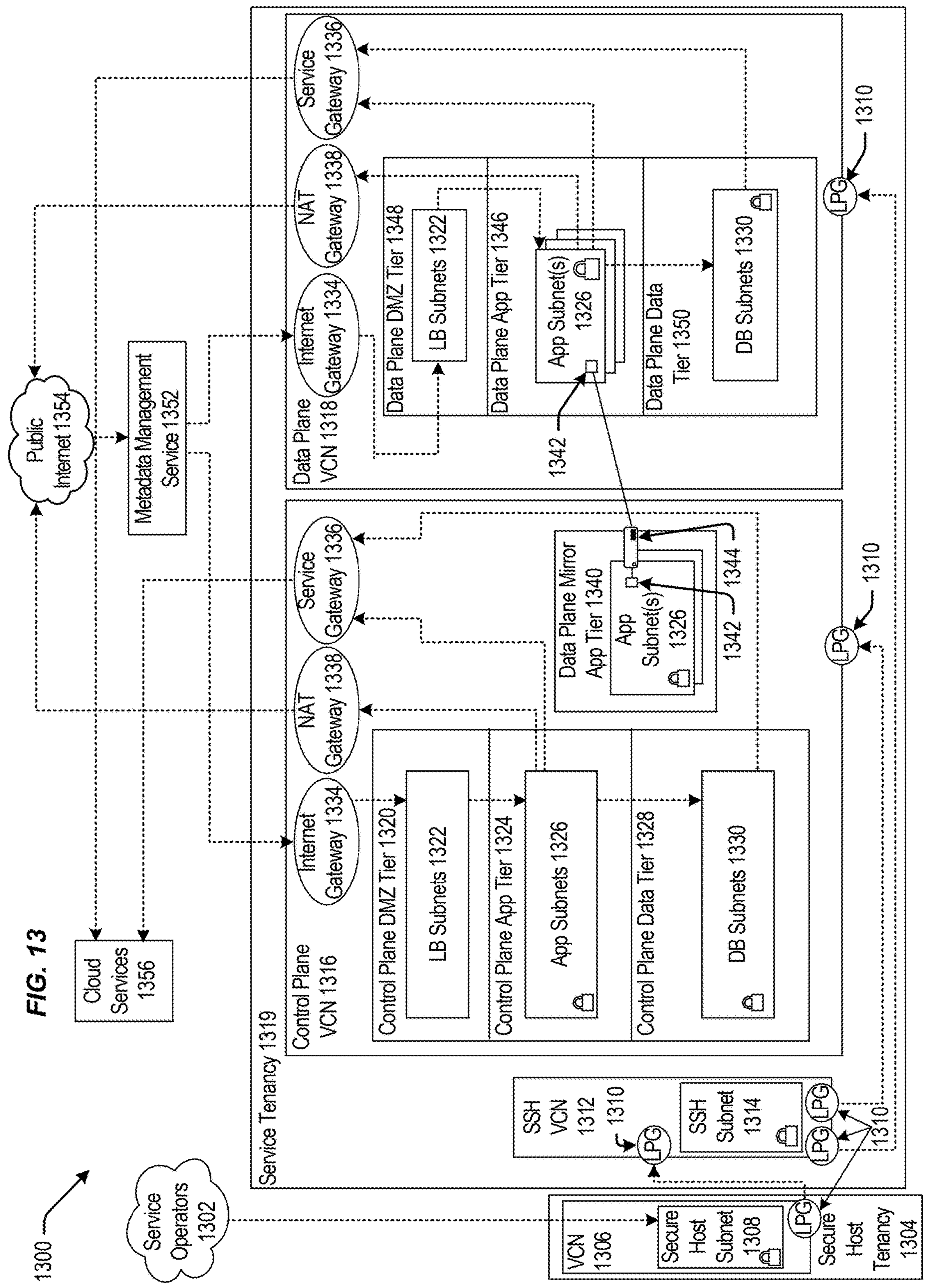
FIG. 13 is a block diagram illustrating one pattern for implementing a cloud infrastructure as a service system, according to at least one embodiment.

FIG. 13 is a block diagram 1300 illustrating an example pattern of an IaaS architecture, according to at least one embodiment. Service operators 1302 can be communicatively coupled to a secure host tenancy 1304 that can include a virtual cloud network (VCN) 1306 and a secure host subnet 1308. In some examples, the service operators 1302 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1306 and/or the Internet.

The VCN 1306 can include a local peering gateway (LPG) 1310 that can be communicatively coupled to a secure shell (SSH) VCN 1312 via an LPG 1310 contained in the SSH VCN 1312. The SSH VCN 1312 can include an SSH subnet 1314, and the SSH VCN 1312 can be communicatively coupled to a control plane VCN 1316 via the LPG 1310 contained in the control plane VCN 1316. Also, the SSH VCN 1312 can be communicatively coupled to a data plane VCN 1318 via an LPG 1310. The control plane VCN 1316 and the data plane VCN 1318 can be contained in a service tenancy 1319 that can be owned and/or operated by the IaaS provider.

The control plane VCN 1316 can include a control plane demilitarized zone (DMZ) tier 1320 that acts as a perimeter network (e.g., portions of a corporate network between the corporate intranet and external networks). The DMZ-based servers may have restricted responsibilities and help keep breaches contained. Additionally, the DMZ tier 1320 can include one or more load balancer (LB) subnet(s) 1322, a control plane app tier 1324 that can include app subnet(s) 1326, a control plane data tier 1328 that can include database (DB) subnet(s) 1330 (e.g., frontend DB subnet(s) and/or backend DB subnet(s)). The LB subnet(s) 1322 contained in the control plane DMZ tier 1320 can be communicatively coupled to the app subnet(s) 1326 contained in the control plane app tier 1324 and an Internet gateway 1334 that can be contained in the control plane VCN 1316, and the app subnet(s) 1326 can be communicatively coupled to the DB subnet(s) 1330 contained in the control plane data tier 1328 and a service gateway 1336 and a network address translation (NAT) gateway 1338. The control plane VCN 1316 can include the service gateway 1336 and the NAT gateway 1338.

The control plane VCN 1316 can include a data plane mirror app tier 1340 that can include app subnet(s) 1326. The app subnet(s) 1326 contained in the data plane mirror app tier 1340 can include a virtual network interface controller (VNIC) 1342 that can execute a compute instance 1344. The compute instance 1344 can communicatively couple the app subnet(s) 1326 of the data plane mirror app tier 1340 to app subnet(s) 1326 that can be contained in a data plane app tier 1346.

The data plane VCN 1318 can include the data plane app tier 1346, a data plane DMZ tier 1348, and a data plane data tier 1350. The data plane DMZ tier 1348 can include LB subnet(s) 1322 that can be communicatively coupled to the app subnet(s) 1326 of the data plane app tier 1346 and the Internet gateway 1334 of the data plane VCN 1318. The app subnet(s) 1326 can be communicatively coupled to the service gateway 1336 of the data plane VCN 1318 and the NAT gateway 1338 of the data plane VCN 1318. The data plane data tier 1350 can also include the DB subnet(s) 1330 that can be communicatively coupled to the app subnet(s) 1326 of the data plane app tier 1346.

The Internet gateway 1334 of the control plane VCN 1316 and of the data plane VCN 1318 can be communicatively coupled to a metadata management service 1352 that can be communicatively coupled to public Internet 1354. Public Internet 1354 can be communicatively coupled to the NAT gateway 1338 of the control plane VCN 1316 and of the data plane VCN 1318. The service gateway 1336 of the control plane VCN 1316 and of the data plane VCN 1318 can be communicatively coupled to cloud services 1356.

In some examples, the service gateway 1336 of the control plane VCN 1316 or of the data plane VCN 1318 can make application programming interface (API) calls to cloud services 1356 without going through public Internet 1354. The API calls to cloud services 1356 from the service gateway 1336 can be one-way: the service gateway 1336 can make API calls to cloud services 1356, and cloud services 1356 can send requested data to the service gateway 1336. But, cloud services 1356 may not initiate API calls to the service gateway 1336.

In some examples, the secure host tenancy 1304 can be directly connected to the service tenancy 1319, which may be otherwise isolated. The secure host subnet 1308 can communicate with the SSH subnet 1314 through an LPG 1310 that may enable two-way communication over an otherwise isolated system. Connecting the secure host subnet 1308 to the SSH subnet 1314 may give the secure host subnet 1308 access to other entities within the service tenancy 1319.

The control plane VCN 1316 may allow users of the service tenancy 1319 to set up or otherwise provision desired resources. Desired resources provisioned in the control plane VCN 1316 may be deployed or otherwise used in the data plane VCN 1318. In some examples, the control plane VCN 1316 can be isolated from the data plane VCN 1318, and the data plane mirror app tier 1340 of the control plane VCN 1316 can communicate with the data plane app tier 1346 of the data plane VCN 1318 via VNICs 1342 that can be contained in the data plane mirror app tier 1340 and the data plane app tier 1346.

In some examples, users of the system, or customers, can make requests, for example create, read, update, or delete (CRUD) operations, through public Internet 1354 that can communicate the requests to the metadata management service 1352. The metadata management service 1352 can communicate the request to the control plane VCN 1316 through the Internet gateway 1334. The request can be received by the LB subnet(s) 1322 contained in the control plane DMZ tier 1320. The LB subnet(s) 1322 may determine that the request is valid, and in response to this determination, the LB subnet(s) 1322 can transmit the request to app subnet(s) 1326 contained in the control plane app tier 1324. If the request is validated and requires a call to public Internet 1354, the call to public Internet 1354 may be transmitted to the NAT gateway 1338 that can make the call to public Internet 1354. Metadata that may be desired to be stored by the request can be stored in the DB subnet(s) 1330.

In some examples, the data plane mirror app tier 1340 can facilitate direct communication between the control plane VCN 1316 and the data plane VCN 1318. For example, changes, updates, or other suitable modifications to configuration may be desired to be applied to the resources contained in the data plane VCN 1318. Via a VNIC 1342, the control plane VCN 1316 can directly communicate with, and can thereby execute the changes, updates, or other suitable modifications to configuration to, resources contained in the data plane VCN 1318.

In some embodiments, the control plane VCN 1316 and the data plane VCN 1318 can be contained in the service tenancy 1319. In this case, the user, or the customer, of the system may not own or operate either the control plane VCN 1316 or the data plane VCN 1318. Instead, the IaaS provider may own or operate the control plane VCN 1316 and the data plane VCN 1318, both of which may be contained in the service tenancy 1319. This embodiment can enable isolation of networks that may prevent users or customers from interacting with other users', or other customers', resources. Also, this embodiment may allow users or customers of the system to store databases privately without needing to rely on public Internet 1354, which may not have a desired level of threat prevention, for storage.

In other embodiments, the LB subnet(s) 1322 contained in the control plane VCN 1316 can be configured to receive a signal from the service gateway 1336. In this embodiment, the control plane VCN 1316 and the data plane VCN 1318 may be configured to be called by a customer of the IaaS provider without calling public Internet 1354. Customers of the IaaS provider may desire this embodiment since database(s) that the customers use may be controlled by the IaaS provider and may be stored on the service tenancy 1319, which may be isolated from public Internet 1354.

Figure 14:
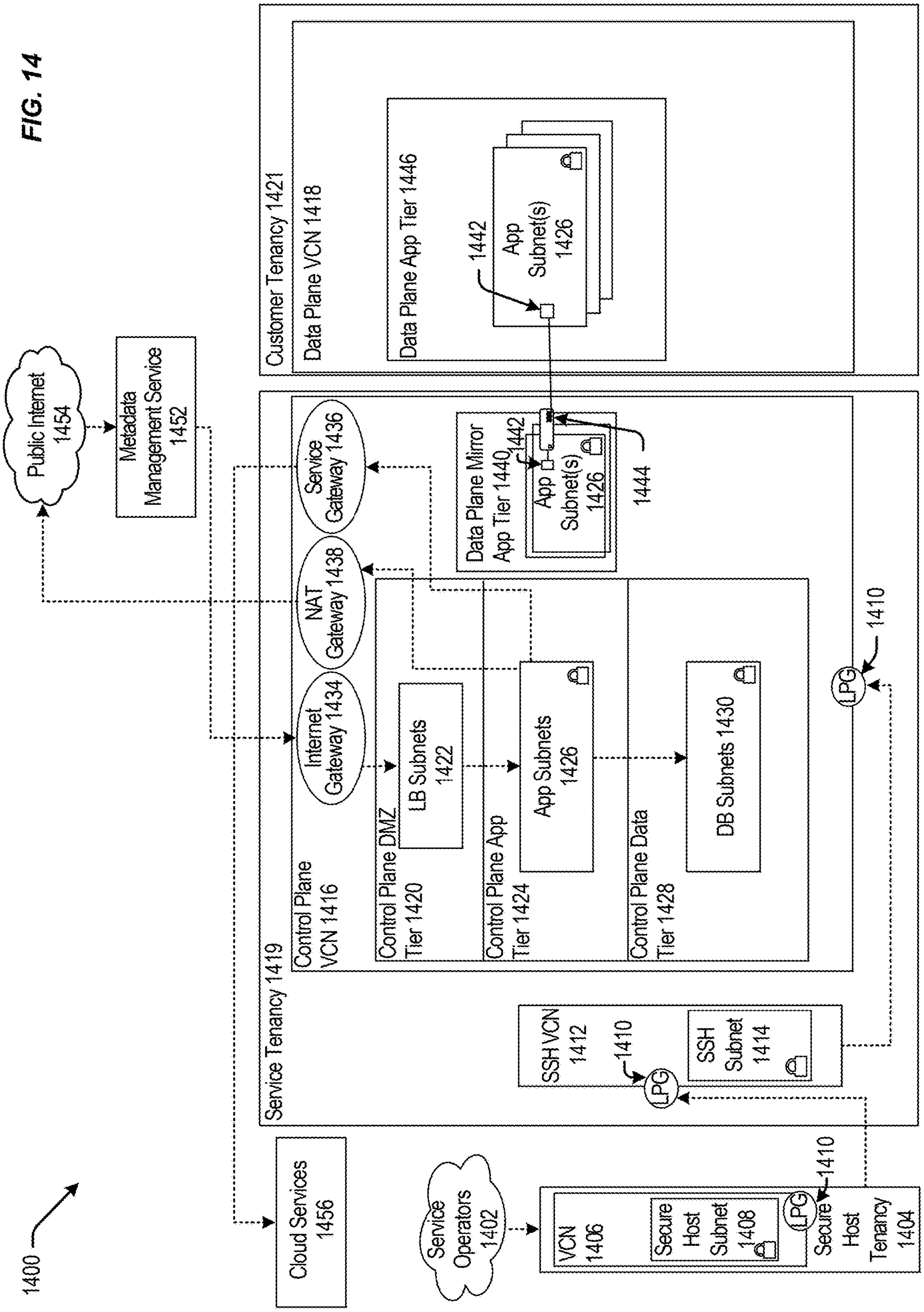
FIG. 14 is a block diagram illustrating another pattern for implementing a cloud infrastructure as a service system, according to at least one embodiment.

FIG. 14 is a block diagram 1400 illustrating another example pattern of an IaaS architecture, according to at least one embodiment. Service operators 1402 (e.g., service operators 1302 of FIG. 13) can be communicatively coupled to a secure host tenancy 1404 (e.g., the secure host tenancy 1304 of FIG. 13) that can include a virtual cloud network (VCN) 1406 (e.g., the VCN 1306 of FIG. 13) and a secure host subnet 1408 (e.g., the secure host subnet 1308 of FIG. 13). The VCN 1406 can include a local peering gateway (LPG) 1410 (e.g., the LPG 1310 of FIG. 13) that can be communicatively coupled to a secure shell (SSH) VCN 1412 (e.g., the SSH VCN 1312 of FIG. 13) via an LPG 1310 contained in the SSH VCN 1412. The SSH VCN 1412 can include an SSH subnet 1414 (e.g., the SSH subnet 1314 of FIG. 13), and the SSH VCN 1412 can be communicatively coupled to a control plane VCN 1416 (e.g., the control plane VCN 1316 of FIG. 13) via an LPG 1410 contained in the control plane VCN 1416. The control plane VCN 1416 can be contained in a service tenancy 1419 (e.g., the service tenancy 1319 of FIG. 13), and the data plane VCN 1418 (e.g., the data plane VCN 1318 of FIG. 13) can be contained in a customer tenancy 1421 that may be owned or operated by users, or customers, of the system.

The control plane VCN 1416 can include a control plane DMZ tier 1420 (e.g., the control plane DMZ tier 1320 of FIG. 13) that can include LB subnet(s) 1422 (e.g., LB subnet(s) 1322 of FIG. 13), a control plane app tier 1424 (e.g., the control plane app tier 1324 of FIG. 13) that can include app subnet(s) 1426 (e.g., app subnet(s) 1326 of FIG. 13), a control plane data tier 1428 (e.g., the control plane data tier 1328 of FIG. 13) that can include database (DB) subnet(s) 1430 (e.g., similar to DB subnet(s) 1330 of FIG. 13). The LB subnet(s) 1422 contained in the control plane DMZ tier 1420 can be communicatively coupled to the app subnet(s) 1426 contained in the control plane app tier 1424 and an Internet gateway 1434 (e.g., the Internet gateway 1334 of FIG. 13) that can be contained in the control plane VCN 1416, and the app subnet(s) 1426 can be communicatively coupled to the DB subnet(s) 1430 contained in the control plane data tier 1428 and a service gateway 1436 (e.g., the service gateway 1336 of FIG. 13) and a network address translation (NAT) gateway 1438 (e.g., the NAT gateway 1338 of FIG. 13). The control plane VCN 1416 can include the service gateway 1436 and the NAT gateway 1438.

The control plane VCN 1416 can include a data plane mirror app tier 1440 (e.g., the data plane mirror app tier 1340 of FIG. 13) that can include app subnet(s) 1426. The app subnet(s) 1426 contained in the data plane mirror app tier 1440 can include a virtual network interface controller (VNIC) 1442 (e.g., the VNIC of 1342) that can execute a compute instance 1444 (e.g., similar to the compute instance 1344 of FIG. 13). The compute instance 1444 can facilitate communication between the app subnet(s) 1426 of the data plane mirror app tier 1440 and the app subnet(s) 1426 that can be contained in a data plane app tier 1446 (e.g., the data plane app tier 1346 of FIG. 13) via the VNIC 1442 contained in the data plane mirror app tier 1440 and the VNIC 1442 contained in the data plane app tier 1446.

The Internet gateway 1434 contained in the control plane VCN 1416 can be communicatively coupled to a metadata management service 1452 (e.g., the metadata management service 1352 of FIG. 13) that can be communicatively coupled to public Internet 1454 (e.g., public Internet 1354 of FIG. 13). Public Internet 1454 can be communicatively coupled to the NAT gateway 1438 contained in the control plane VCN 1416. The service gateway 1436 contained in the control plane VCN 1416 can be communicatively coupled to cloud services 1456 (e.g., cloud services 1356 of FIG. 13).

In some examples, the data plane VCN 1418 can be contained in the customer tenancy 1421. In this case, the IaaS provider may provide the control plane VCN 1416 for each customer, and the IaaS provider may, for each customer, set up a unique compute instance 1444 that is contained in the service tenancy 1419. Each compute instance 1444 may allow communication between the control plane VCN 1416, contained in the service tenancy 1419, and the data plane VCN 1418 that is contained in the customer tenancy 1421. The compute instance 1444 may allow resources, that are provisioned in the control plane VCN 1416 that is contained in the service tenancy 1419, to be deployed or otherwise used in the data plane VCN 1418 that is contained in the customer tenancy 1421.

In other examples, the customer of the IaaS provider may have databases that live in the customer tenancy 1421. In this example, the control plane VCN 1416 can include the data plane mirror app tier 1440 that can include app subnet(s) 1426. The data plane mirror app tier 1440 can reside in the data plane VCN 1418, but the data plane mirror app tier 1440 may not live in the data plane VCN 1418. That is, the data plane mirror app tier 1440 may have access to the customer tenancy 1421, but the data plane mirror app tier 1440 may not exist in the data plane VCN 1418 or be owned or operated by the customer of the IaaS provider. The data plane mirror app tier 1440 may be configured to make calls to the data plane VCN 1418 but may not be configured to make calls to any entity contained in the control plane VCN 1416. The customer may desire to deploy or otherwise use resources in the data plane VCN 1418 that are provisioned in the control plane VCN 1416, and the data plane mirror app tier 1440 can facilitate the desired deployment, or other usage of resources, of the customer.

In some embodiments, the customer of the IaaS provider can apply filters to the data plane VCN 1418. In this embodiment, the customer can determine what the data plane VCN 1418 can access, and the customer may restrict access to public Internet 1454 from the data plane VCN 1418. The IaaS provider may not be able to apply filters or otherwise control access of the data plane VCN 1418 to any outside networks or databases. Applying filters and controls by the customer onto the data plane VCN 1418, contained in the customer tenancy 1421, can help isolate the data plane VCN 1418 from other customers and from public Internet 1454.

In some embodiments, cloud services 1456 can be called by the service gateway 1436 to access services that may not exist on public Internet 1454, on the control plane VCN 1416, or on the data plane VCN 1418. The connection between cloud services 1456 and the control plane VCN 1416 or the data plane VCN 1418 may not be live or continuous. Cloud services 1456 may exist on a different network owned or operated by the IaaS provider. Cloud services 1456 may be configured to receive calls from the service gateway 1436 and may be configured to not receive calls from public Internet 1454. Some cloud services 1456 may be isolated from other cloud services 1456, and the control plane VCN 1416 may be isolated from cloud services 1456 that may not be in the same region as the control plane VCN 1416. For example, the control plane VCN 1416 may be located in "Region 1," and cloud service "Deployment 13," may be located in Region 1 and in "Region 2." If a call to Deployment 13 is made by the service gateway 1436 contained in the control plane VCN 1416 located in Region 1, the call may be transmitted to Deployment 13 in Region 1. In this example, the control plane VCN 1416, or Deployment 13 in Region 1, may not be communicatively coupled to, or otherwise in communication with, Deployment 13 in Region 2.

Figure 15:
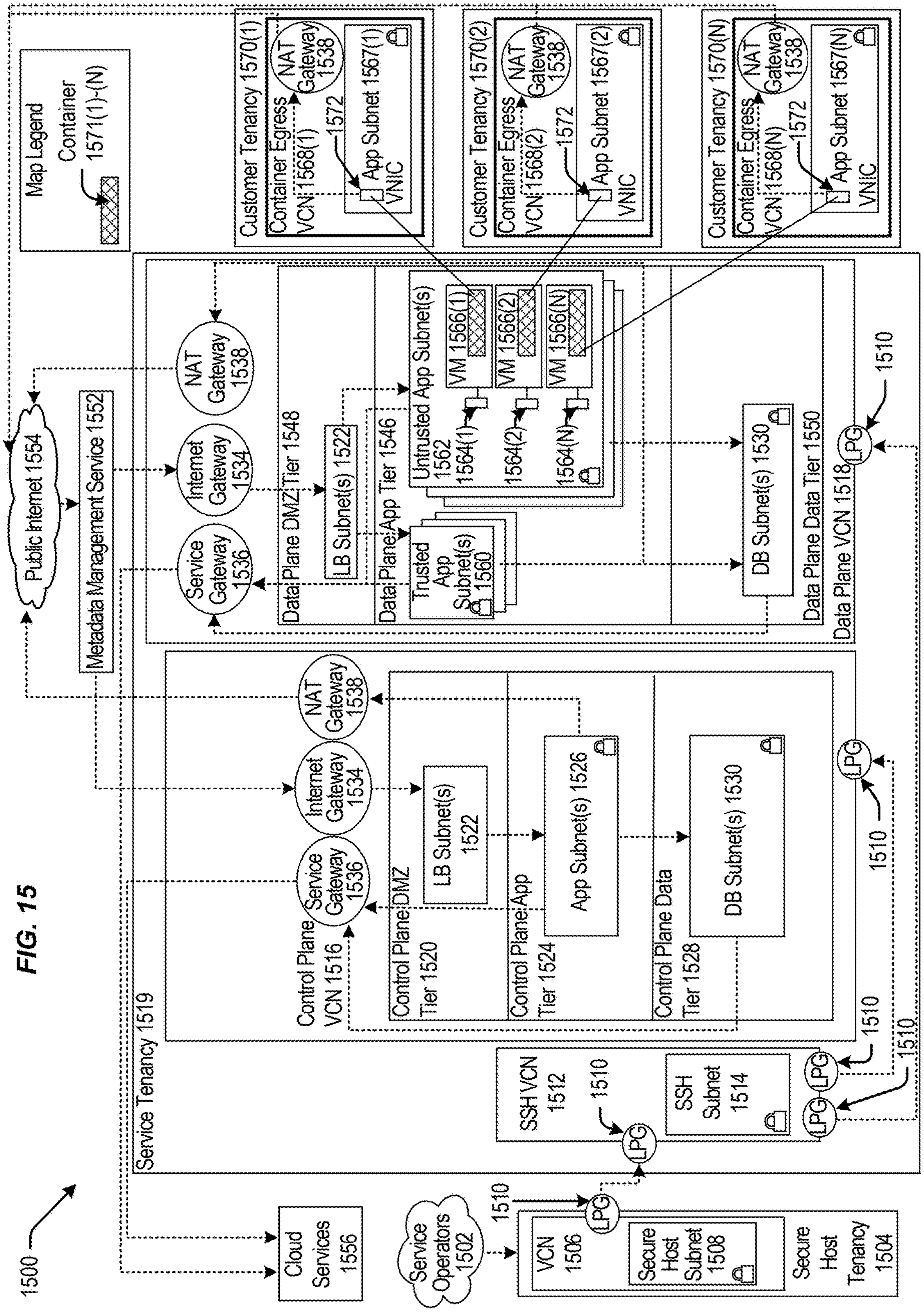
FIG. 15 is a block diagram illustrating another pattern for implementing a cloud infrastructure as a service system, according to at least one embodiment.

FIG. 15 is a block diagram 1500 illustrating another example pattern of an IaaS architecture, according to at least one embodiment. Service operators 1502 (e.g., service operators 1302 of FIG. 13) can be communicatively coupled to a secure host tenancy 1504 (e.g., the secure host tenancy 1304 of FIG. 13) that can include a virtual cloud network (VCN) 1506 (e.g., the VCN 1306 of FIG. 13) and a secure host subnet 1508 (e.g., the secure host subnet 1308 of FIG. 13). The VCN 1506 can include an LPG 1510 (e.g., the LPG 1310 of FIG. 13) that can be communicatively coupled to an SSH VCN 1512 (e.g., the SSH VCN 1312 of FIG. 13) via an LPG 1510 contained in the SSH VCN 1512. The SSH VCN 1512 can include an SSH subnet 1514 (e.g., the SSH subnet 1314 of FIG. 13), and the SSH VCN 1512 can be communicatively coupled to a control plane VCN 1516 (e.g., the control plane VCN 1316 of FIG. 13) via an LPG 1510 contained in the control plane VCN 1516 and to a data plane VCN 1518 (e.g., the data plane 1318 of FIG. 13) via an LPG 1510 contained in the data plane VCN 1518. The control plane VCN 1516 and the data plane VCN 1518 can be contained in a service tenancy 1519 (e.g., the service tenancy 1319 of FIG. 13).

The control plane VCN 1516 can include a control plane DMZ tier 1520 (e.g., the control plane DMZ tier 1320 of FIG. 13) that can include load balancer (LB) subnet(s) 1522 (e.g., LB subnet(s) 1322 of FIG. 13), a control plane app tier 1524 (e.g., the control plane app tier 1324 of FIG. 13) that can include app subnet(s) 1526 (e.g., similar to app subnet(s) 1326 of FIG. 13), a control plane data tier 1528 (e.g., the control plane data tier 1328 of FIG. 13) that can include DB subnet(s) 1530. The LB subnet(s) 1522 contained in the control plane DMZ tier 1520 can be communicatively coupled to the app subnet(s) 1526 contained in the control plane app tier 1524 and to an Internet gateway 1534 (e.g., the Internet gateway 1334 of FIG. 13) that can be contained in the control plane VCN 1516, and the app subnet(s) 1526 can be communicatively coupled to the DB subnet(s) 1530 contained in the control plane data tier 1528 and to a service gateway 1536 (e.g., the service gateway of FIG. 13) and a network address translation (NAT) gateway 1538 (e.g., the NAT gateway 1338 of FIG. 13). The control plane VCN 1516 can include the service gateway 1536 and the NAT gateway 1538.

The data plane VCN 1518 can include a data plane app tier 1546 (e.g., the data plane app tier 1346 of FIG. 13), a data plane DMZ tier 1548 (e.g., the data plane DMZ tier 1348 of FIG. 13), and a data plane data tier 1550 (e.g., the data plane data tier 1350 of FIG. 13). The data plane DMZ tier 1548 can include LB subnet(s) 1522 that can be communicatively coupled to trusted app subnet(s) 1560 and untrusted app subnet(s) 1562 of the data plane app tier 1546 and the Internet gateway 1534 contained in the data plane VCN 1518. The trusted app subnet(s) 1560 can be communicatively coupled to the service gateway 1536 contained in the data plane VCN 1518, the NAT gateway 1538 contained in the data plane VCN 1518, and DB subnet(s) 1530 contained in the data plane data tier 1550. The untrusted app subnet(s) 1562 can be communicatively coupled to the service gateway 1536 contained in the data plane VCN 1518 and DB subnet(s) 1530 contained in the data plane data tier 1550. The data plane data tier 1550 can include DB subnet(s) 1530 that can be communicatively coupled to the service gateway 1536 contained in the data plane VCN 1518.

The untrusted app subnet(s) 1562 can include one or more primary VNICs 1564(1)-(N) that can be communicatively coupled to tenant virtual machines (VMs) 1566(1)-(N). Each tenant VM 1566(1)-(N) can be communicatively coupled to a respective app subnet 1567(1)-(N) that can be contained in respective container egress VCNs 1568(1)-(N) that can be contained in respective customer tenancies 1570(1)-(N). Respective secondary VNICs 1572(1)-(N) can facilitate communication between the untrusted app subnet(s) 1562 contained in the data plane VCN 1518 and the app subnet contained in the container egress VCNs 1568(1)-(N). Each container egress VCNs 1568(1)-(N) can include a NAT gateway 1538 that can be communicatively coupled to public Internet 1554 (e.g., public Internet 1354 of FIG. 13).

The Internet gateway 1534 contained in the control plane VCN 1516 and contained in the data plane VCN 1518 can be communicatively coupled to a metadata management service 1552 (e.g., the metadata management system 1352 of FIG. 13) that can be communicatively coupled to public Internet 1554. Public Internet 1554 can be communicatively coupled to the NAT gateway 1538 contained in the control plane VCN 1516 and contained in the data plane VCN 1518. The service gateway 1536 contained in the control plane VCN 1516 and contained in the data plane VCN 1518 can be communicatively coupled to cloud services 1556.

In some embodiments, the data plane VCN 1518 can be integrated with customer tenancies 1570. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1546. Code to run the function may be executed in the VMs 1566(1)-(N), and the code may not be configured to run anywhere else on the data plane VCN 1518. Each VM 1566(1)-(N) may be connected to one customer tenancy 1570. Respective containers 1571(1)-(N) contained in the VMs 1566(1)-(N) may be configured to run the code. In this case, there can be a dual isolation (e.g., the containers 1571(1)-(N) running code, where the containers 1571(1)-(N) may be contained in at least the VM 1566(1)-(N) that are contained in the untrusted app subnet(s) 1562), which may help prevent incorrect or otherwise undesirable code from damaging the network of the IaaS provider or from damaging a network of a different customer. The containers 1571(1)-(N) may be communicatively coupled to the customer tenancy 1570 and may be configured to transmit or receive data from the customer tenancy 1570. The containers 1571(1)-(N) may not be configured to transmit or receive data from any other entity in the data plane VCN 1518. Upon completion of running the code, the IaaS provider may kill or otherwise dispose of the containers 1571(1)-(N).

In some embodiments, the trusted app subnet(s) 1560 may run code that may be owned or operated by the IaaS provider. In this embodiment, the trusted app subnet(s) 1560 may be communicatively coupled to the DB subnet(s) 1530 and be configured to execute CRUD operations in the DB subnet(s) 1530. The untrusted app subnet(s) 1562 may be communicatively coupled to the DB subnet(s) 1530, but in this embodiment, the untrusted app subnet(s) may be configured to execute read operations in the DB subnet(s) 1530. The containers 1571(1)-(N) that can be contained in the VM 1566(1)-(N) of each customer and that may run code from the customer may not be communicatively coupled with the DB subnet(s) 1530.

In other embodiments, the control plane VCN 1516 and the data plane VCN 1518 may not be directly communicatively coupled. In this embodiment, there may be no direct communication between the control plane VCN 1516 and the data plane VCN 1518. However, communication can occur indirectly through at least one method. An LPG 1510 may be established by the IaaS provider that can facilitate communication between the control plane VCN 1516 and the data plane VCN 1518. In another example, the control plane VCN 1516 or the data plane VCN 1518 can make a call to cloud services 1556 via the service gateway 1536. For example, a call to cloud services 1556 from the control plane VCN 1516 can include a request for a service that can communicate with the data plane VCN 1518.

Figure 16:
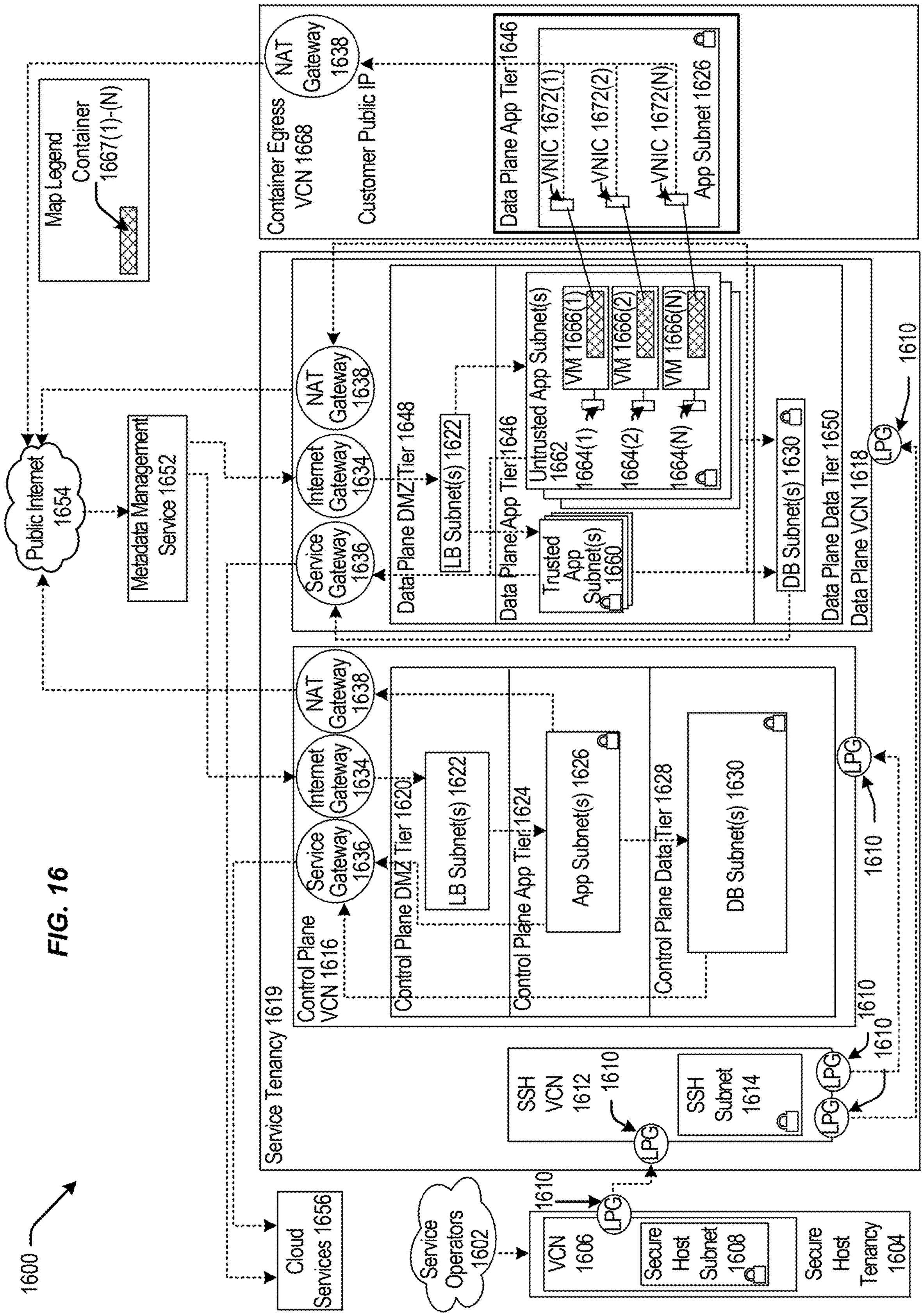
FIG. 16 is a block diagram illustrating another pattern for implementing a cloud infrastructure as a service system, according to at least one embodiment.

FIG. 16 is a block diagram 1600 illustrating another example pattern of an IaaS architecture, according to at least one embodiment. Service operators 1602 (e.g., service operators 1302 of FIG. 13) can be communicatively coupled to a secure host tenancy 1604 (e.g., the secure host tenancy 1304 of FIG. 13) that can include a virtual cloud network (VCN) 1606 (e.g., the VCN 1306 of FIG. 13) and a secure host subnet 1608 (e.g., the secure host subnet 1308 of FIG. 13). The VCN 1606 can include an LPG 1610 (e.g., the LPG 1310 of FIG. 13) that can be communicatively coupled to an SSH VCN 1612 (e.g., the SSH VCN 1312 of FIG. 13) via an LPG 1610 contained in the SSH VCN 1612. The SSH VCN 1612 can include an SSH subnet 1614 (e.g., the SSH subnet 1314 of FIG. 13), and the SSH VCN 1612 can be communicatively coupled to a control plane VCN 1616 (e.g., the control plane VCN 1316 of FIG. 13) via an LPG 1610 contained in the control plane VCN 1616 and to a data plane VCN 1618 (e.g., the data plane 1318 of FIG. 13) via an LPG 1610 contained in the data plane VCN 1618. The control plane VCN 1616 and the data plane VCN 1618 can be contained in a service tenancy 1619 (e.g., the service tenancy 1319 of FIG. 13).

The control plane VCN 1616 can include a control plane DMZ tier 1620 (e.g., the control plane DMZ tier 1320 of FIG. 13) that can include LB subnet(s) 1622 (e.g., LB subnet(s) 1322 of FIG. 13), a control plane app tier 1624 (e.g., the control plane app tier 1324 of FIG. 13) that can include app subnet(s) 1626 (e.g., app subnet(s) 1326 of FIG. 13), a control plane data tier 1628 (e.g., the control plane data tier 1328 of FIG. 13) that can include DB subnet(s) 1630 (e.g., DB subnet(s) 1530 of FIG. 15). The LB subnet(s) 1622 contained in the control plane DMZ tier 1620 can be communicatively coupled to the app subnet(s) 1626 contained in the control plane app tier 1624 and to an Internet gateway 1634 (e.g., the Internet gateway 1334 of FIG. 13) that can be contained in the control plane VCN 1616, and the app subnet(s) 1626 can be communicatively coupled to the DB subnet(s) 1630 contained in the control plane data tier 1628 and to a service gateway 1636 (e.g., the service gateway of FIG. 13) and a network address translation (NAT) gateway 1638 (e.g., the NAT gateway 1338 of FIG. 13). The control plane VCN 1616 can include the service gateway 1636 and the NAT gateway 1638.

The data plane VCN 1618 can include a data plane app tier 1646 (e.g., the data plane app tier 1346 of FIG. 13), a data plane DMZ tier 1648 (e.g., the data plane DMZ tier 1348 of FIG. 13), and a data plane data tier 1650 (e.g., the data plane data tier 1350 of FIG. 13). The data plane DMZ tier 1648 can include LB subnet(s) 1622 that can be communicatively coupled to trusted app subnet(s) 1660 (e.g., trusted app subnet(s) 1560 of FIG. 15) and untrusted app subnet(s) 1662 (e.g., untrusted app subnet(s) 1562 of FIG. 15) of the data plane app tier 1646 and the Internet gateway 1634 contained in the data plane VCN 1618. The trusted app subnet(s) 1660 can be communicatively coupled to the service gateway 1636 contained in the data plane VCN 1618, the NAT gateway 1638 contained in the data plane VCN 1618, and DB subnet(s) 1630 contained in the data plane data tier 1650. The untrusted app subnet(s) 1662 can be communicatively coupled to the service gateway 1636 contained in the data plane VCN 1618 and DB subnet(s) 1630 contained in the data plane data tier 1650. The data plane data tier 1650 can include DB subnet(s) 1630 that can be communicatively coupled to the service gateway 1636 contained in the data plane VCN 1618.

The untrusted app subnet(s) 1662 can include primary VNICs 1664(1)-(N) that can be communicatively coupled to tenant virtual machines (VMs) 1666(1)-(N) residing within the untrusted app subnet(s) 1662. Each tenant VM 1666(1)-(N) can run code in a respective container 1667(1)-(N), and be communicatively coupled to an app subnet 1626 that can be contained in a data plane app tier 1646 that can be contained in a container egress VCN 1668. Respective secondary VNICs 1672(1)-(N) can facilitate communication between the untrusted app subnet(s) 1662 contained in the data plane VCN 1618 and the app subnet contained in the container egress VCN 1668. The container egress VCN can include a NAT gateway 1638 that can be communicatively coupled to public Internet 1654 (e.g., public Internet 1354 of FIG. 13).

The Internet gateway 1634 contained in the control plane VCN 1616 and contained in the data plane VCN 1618 can be communicatively coupled to a metadata management service 1652 (e.g., the metadata management system 1352 of FIG. 13) that can be communicatively coupled to public Internet 1654. Public Internet 1654 can be communicatively coupled to the NAT gateway 1638 contained in the control plane VCN 1616 and contained in the data plane VCN 1618. The service gateway 1636 contained in the control plane VCN 1616 and contained in the data plane VCN 1618 can be communicatively coupled to cloud services 1656.

In some examples, the pattern illustrated by the architecture of block diagram 1600 of FIG. 16 may be considered an exception to the pattern illustrated by the architecture of block diagram 1500 of FIG. 15 and may be desirable for a customer of the IaaS provider if the IaaS provider cannot directly communicate with the customer (e.g., a disconnected region). The respective containers 1667(1)-(N) that are contained in the VMs 1666(1)-(N) for each customer can be accessed in real-time by the customer. The containers 1667(1)-(N) may be configured to make calls to respective secondary VNICs 1672(1)-(N) contained in app subnet(s) 1626 of the data plane app tier 1646 that can be contained in the container egress VCN 1668. The secondary VNICs 1672(1)-(N) can transmit the calls to the NAT gateway 1638 that may transmit the calls to public Internet 1654. In this example, the containers 1667(1)-(N) that can be accessed in real-time by the customer can be isolated from the control plane VCN 1616 and can be isolated from other entities contained in the data plane VCN 1618. The containers 1667(1)-(N) may also be isolated from resources from other customers.

In other examples, the customer can use the containers 1667(1)-(N) to call cloud services 1656. In this example, the customer may run code in the containers 1667(1)-(N) that requests a service from cloud services 1656. The containers 1667(1)-(N) can transmit this request to the secondary VNICs 1672(1)-(N) that can transmit the request to the NAT gateway that can transmit the request to public Internet 1654. Public Internet 1654 can transmit the request to LB subnet(s) 1622 contained in the control plane VCN 1616 via the Internet gateway 1634. In response to determining the request is valid, the LB subnet(s) can transmit the request to app subnet(s) 1626 that can transmit the request to cloud services 1656 via the service gateway 1636.

It should be appreciated that IaaS architectures 1300, 1400, 1500, 1600 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 17:
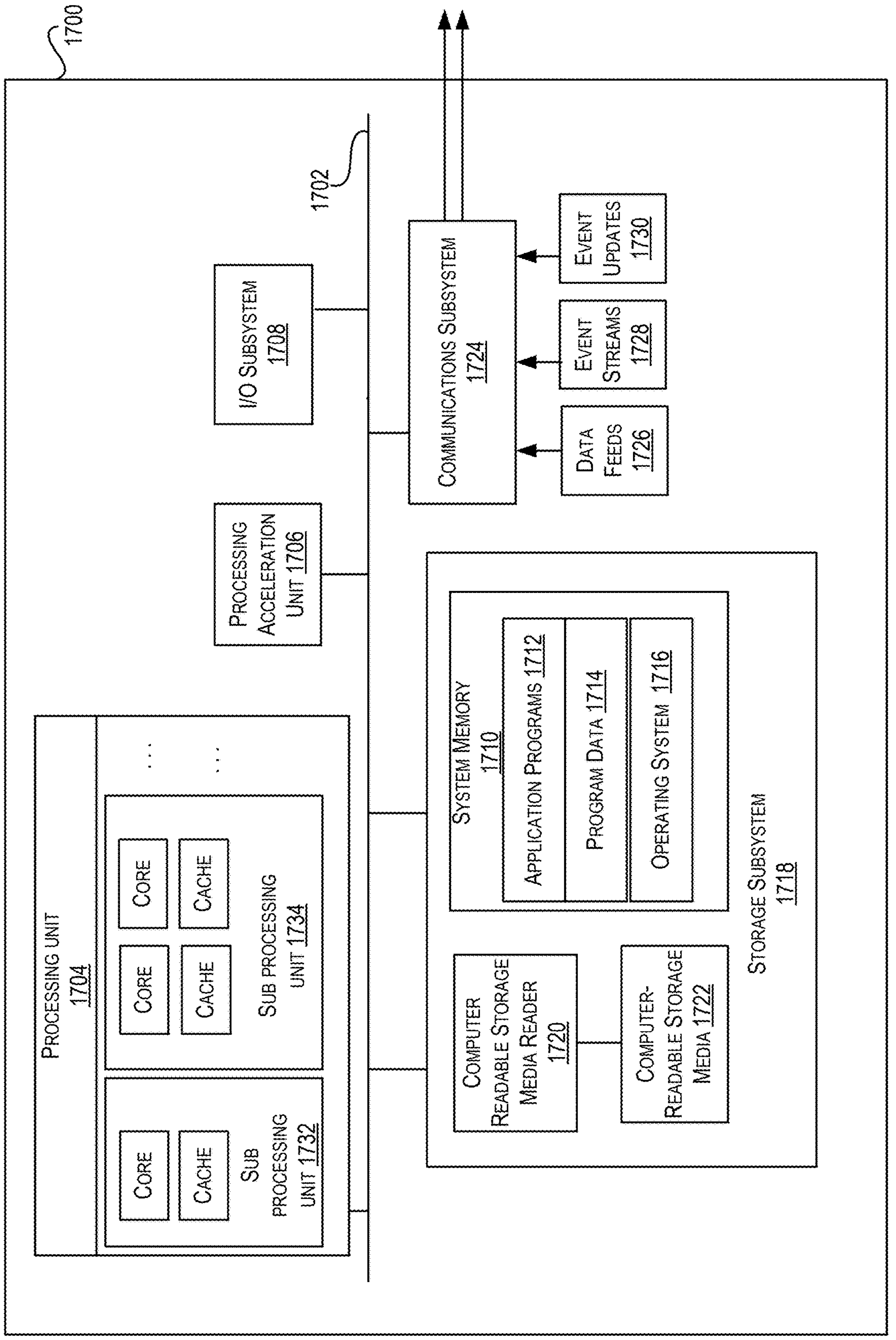
FIG. 17 is a block diagram illustrating an example computer system, according to at least one embodiment.

FIG. 17 illustrates an example computer system 1700, in which various embodiments may be implemented. The system 1700 may be used to implement any of the computer systems described above. As shown in the figure, computer system 1700 includes a processing unit 1704 that communicates with a number of peripheral subsystems via a bus subsystem 1702. These peripheral subsystems may include a processing acceleration unit 1706, an I/O subsystem 1708, a storage subsystem 1718 and a communications subsystem 1724. Storage subsystem 1718 includes tangible computer-readable storage media 1722 and a system memory 1710.

Bus subsystem 1702 provides a mechanism for letting the various components and subsystems of computer system 1700 communicate with each other as intended. Although bus subsystem 1702 is shown schematically as a single bus, alternative embodiments of the bus subsystem may utilize multiple buses. Bus subsystem 1702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1704, which can be implemented as one or more integrated circuits (e.g., a conventional microprocessor or microcontroller), controls the operation of computer system 1700. One or more processors may be included in processing unit 1704. These processors may include single core or multicore processors. In certain embodiments, processing unit 1704 may be implemented as one or more independent processing units 1732 and/or 1734 with single or multicore processors included in each processing unit. In other embodiments, processing unit 1704 may also be implemented as a quad-core processing unit formed by integrating two dual-core processors into a single chip.

In various embodiments, processing unit 1704 can execute a variety of programs in response to program code and can maintain multiple concurrently executing programs or processes. At any given time, some or all of the program code to be executed can be resident in processor(s) 1704 and/or in storage subsystem 1718. Through suitable programming, processor(s) 1704 can provide various functionalities described above. Computer system 1700 may additionally include a processing acceleration unit 1706, which can include a digital signal processor (DSP), a special-purpose processor, and/or the like.

I/O subsystem 1708 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1700 may comprise a storage subsystem 1718 that provides a tangible non-transitory computer-readable storage medium for storing software and data constructs that provide the functionality of the embodiments described in this disclosure. The software can include programs, code, instructions, scripts, etc., that when executed by one or more cores or processors of processing unit 1704 provide the functionality described above. Storage subsystem 1718 may also provide a repository for storing data used in accordance with the present disclosure.

As depicted in the example in FIG. 17, storage subsystem 1718 can include various components including a system memory 1710, computer-readable storage media 1722, and a computer readable storage media reader 1720. System memory 1710 may store program instructions that are loadable and executable by processing unit 1704. System memory 1710 may also store data that is used during the execution of the instructions and/or data that is generated during the execution of the program instructions. Various different kinds of programs may be loaded into system memory 1710 including but not limited to client applications, Web browsers, mid-tier applications, relational database management systems (RDBMS), virtual machines, containers, etc.

System memory 1710 may also store an operating system 1716. Examples of operating system 1716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1700 executes one or more virtual machines, the virtual machines along with their guest operating systems (GOSs) may be loaded into system memory 1710 and executed by one or more processors or cores of processing unit 1704.

System memory 1710 can come in different configurations depending upon the type of computer system 1700. For example, system memory 1710 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1710 may include a basic input/output system (BIOS) containing basic routines that help to transfer information between elements within computer system 1700, such as during start-up.

Computer-readable storage media 1722 may represent remote, local, fixed, and/or removable storage devices plus storage media for temporarily and/or more permanently containing, storing, computer-readable information for use by computer system 1700 including instructions executable by processing unit 1704 of computer system 1700.

Computer-readable storage media 1722 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1722 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1722 may include, but is not limited to, Zip® drives, flash memory cards, universal serial bus (USB) flash drives, secure digital (SD) cards, DVD disks, digital video tape, and the like. Computer-readable storage media 1722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program services, and other data for computer system 1700.

Machine-readable instructions executable by one or more processors or cores of processing unit 1704 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1724 provides an interface to other computer systems and networks. Communications subsystem 1724 serves as an interface for receiving data from and transmitting data to other systems from computer system 1700. For example, communications subsystem 1724 may enable computer system 1700 to connect to one or more devices via the Internet. In some embodiments communications subsystem 1724 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof)), global positioning system (GPS) receiver components, and/or other components. In some embodiments communications subsystem 1724 can provide wired network connectivity (e.g., Ethernet) in addition to or instead of a wireless interface.

In some embodiments, communications subsystem 1724 may also receive input communication in the form of structured and/or unstructured data feeds 1726, event streams 1728, event updates 1730, and the like on behalf of one or more users who may use computer system 1700.

By way of example, communications subsystem 1724 may be configured to receive data feeds 1726 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1724 may also be configured to receive data in the form of continuous data streams, which may include event streams 1728 of real-time events and/or event updates 1730, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1724 may also be configured to output the structured and/or unstructured data feeds 1726, event streams 1728, event updates 1730, and the like to one or more databases that may be in communication with one or more streaming data source computers coupled to computer system 1700.

Computer system 1700 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1700 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:

executing, at a computing device of a reduced footprint data center, a cryptographic service;

generating, by the cryptographic service, a master encryption key;

encrypting, using a secure component of the computing device, the master encryption key to produce an encrypted master encryption key;

storing the encrypted master encryption key in a block storage volume communicatively connected to the computing device;

transmitting, by the cryptographic service to a host region data center, the master encryption key;

receiving, by the cryptographic service from a host region data center, a wrapped master encryption key; and storing the wrapped master encryption key in a database of the reduced footprint data center.

2. The method of claim 1, wherein the wrapped master encryption key is generated by a hardware security module of the host region data center by encrypting the master encryption key using a root encryption key to produce a second encrypted master encryption key and signing the second encrypted master encryption key with a root signing key.

3. The method of claim 1, wherein transmitting the master encryption key to the host region data center comprises transmitting the master encryption key using a cross-realm communication channel established using identity data corresponding to the cryptographic service, the identity data generated in the host region data center.

4. The method of claim 1, wherein the computing device is a first computing device, the secure component is a first secure component, and further comprising:

determining that a second computing device of the reduced footprint data center does not have the master encryption key;

obtaining, by the cryptographic service at the first computing device, the encrypted master encryption key;

decrypting, using the first secure component, the encrypted master encryption key to produce the master encryption key;

transmitting, to the second computing device using a secure communication channel, the master encryption key;

encrypting, using a second secure component of the second computing device, the master encryption key to produce a second encrypted master encryption key; and storing the second encrypted master encryption key in a second block storage volume communicatively connected to the second computing device.

5. The method of claim 4, wherein the secure communication channel comprises a mutual transport layer security (mTLS) channel.

6. The method of claim 1, further comprising:

receiving an indication that a data recovery process is initiated;

responsive to the indication, retrieving, from the database, the wrapped master encryption key;

transmitting, to the host data center, the wrapped master encryption key; and receiving, from the host data center, the master encryption key, wherein the wrapped master encryption key is authenticated and decrypted by a hardware security component of the host data center to produce the master encryption key.

7. The method of claim 1, wherein the secure component comprises a trusted platform module.

8. A computing system comprising:

one or more processors; and one or more memories storing computer-executable instructions that, when executed by the one or more processors, cause the computing system to at least:

execute, at a computing device of the computing system, a cryptographic service;

generate, by the cryptographic service, a master encryption key;

encrypt, using a secure component of the computing device, the master encryption key to produce an encrypted master encryption key;

store the encrypted master encryption key in a block storage volume communicatively connected to the computing device;

transmit, by the cryptographic service to a host region data center, the master encryption key;

receive, by the cryptographic service from a host region data center, a wrapped master encryption key; and store the wrapped master encryption key in a database of the computing system.

9. The computing system of claim 8, wherein the wrapped master encryption key is generated by a hardware security module of the host region data center by encrypting the master encryption key using a root encryption key to produce a second encrypted master encryption key and signing the second encrypted master encryption key with a root signing key.

10. The computing system of claim 8, wherein transmitting the master encryption key to the host region data center comprises transmitting the master encryption key using a cross-realm communication channel established using identity data corresponding to the cryptographic service, the identity data generated in the host region data center.

11. The computing system of claim 8, wherein the computing device is a first computing device, the secure component is a first secure component, and wherein the one or more memories store additional computer-executable instructions that, when executed by the one or more processors, cause the computing system to further:

determine that a second computing device of the computing system does not have the master encryption key;

obtain, by the cryptographic service at the first computing device, the encrypted master encryption key;

decrypt, using the first secure component, the encrypted master encryption key to produce the master encryption key;

transmit, to the second computing device using a secure communication channel, the master encryption key;

encrypt, using a second secure component of the second computing device, the master encryption key to produce a second encrypted master encryption key; and store the second encrypted master encryption key in a second block storage volume communicatively connected to the second computing device.

12. The computing system of claim 11, wherein the secure communication channel comprises a mutual transport layer security (mTLS) channel.

13. The computing system of claim 8, wherein the one or more memories store additional computer-executable instructions that, when executed by the one or more processors, cause the computing system to further:

receive an indication that a data recovery process is initiated;

responsive to the indication, retrieve, from the database, the wrapped master encryption key;

transmit, to the host data center, the wrapped master encryption key; and receive, from the host data center, the master encryption key, wherein the wrapped master encryption key is authenticated and decrypted by a hardware security component of the host data center to produce the master encryption key.

14. The computing system of claim 8, wherein the secure component comprises a trusted platform module.

15. A non-transitory computer-readable medium storing instructions that, when executed by one or more processors of a computing system, cause the computing system to at least:

execute, at a computing device of the computing system, a cryptographic service;

generate, by the cryptographic service, a master encryption key;

encrypt, using a secure component of the computing device, the master encryption key to produce an encrypted master encryption key;

store the encrypted master encryption key in a block storage volume communicatively connected to the computing device;

transmit, by the cryptographic service to a host region data center, the master encryption key;

receive, by the cryptographic service from a host region data center, a wrapped master encryption key; and store the wrapped master encryption key in a database of the computing system.

16. The non-transitory computer-readable medium of claim 15, wherein the wrapped master encryption key is generated by a hardware security module of the host region data center by encrypting the master encryption key using a root encryption key to produce a second encrypted master encryption key and signing the second encrypted master encryption key with a root signing key.

17. The non-transitory computer-readable medium of claim 15, wherein transmitting the master encryption key to the host region data center comprises transmitting the master encryption key using a cross-realm communication channel established using identity data corresponding to the cryptographic service, the identity data generated in the host region data center.

18. The non-transitory computer-readable medium of claim 15, wherein the computing device is a first computing device, the secure component is a first secure component, and wherein the one or more memories store additional computer-executable instructions that, when executed by the one or more processors, cause the computing system to further:

determine that a second computing device of the computing system does not have the master encryption key;

obtain, by the cryptographic service at the first computing device, the encrypted master encryption key;

decrypt, using the first secure component, the encrypted master encryption key to produce the master encryption key;

transmit, to the second computing device using a secure communication channel, the master encryption key;

encrypt, using a second secure component of the second computing device, the master encryption key to produce a second encrypted master encryption key; and store the second encrypted master encryption key in a second block storage volume communicatively connected to the second computing device.

19. The non-transitory computer-readable medium of claim 18, wherein the secure communication channel comprises a mutual transport layer security (mTLS) channel.

20. The non-transitory computer-readable medium of claim 15, wherein the one or more memories store additional computer-executable instructions that, when executed by the one or more processors, cause the computing system to further:

receive an indication that a data recovery process is initiated;

responsive to the indication, retrieve, from the database, the wrapped master encryption key;

transmit, to the host data center, the wrapped master encryption key; and receive, from the host data center, the master encryption key, wherein the wrapped master encryption key is authenticated and decrypted by a hardware security component of the host data center to produce the master encryption key.

* * * * *